United States Patent [19]
Fushimi et al.

[11] Patent Number: 5,430,562
[45] Date of Patent: Jul. 4, 1995

[54] LIQUID CRYSTAL LIGHT VALVE INCLUDING BETWEEN LIGHT AND LIGHT VALVE MICROLENSES AND TWO REFLECTING LAYERS WITH A MATRIX OF OPENINGS

[75] Inventors: Yoshimasa Fushimi, Hirakata; Yoshito Miyatake, Neyagawa, both of Japan

[73] Assignee: Matsushita Electric Industrial Co., Ltd., Japan

[21] Appl. No.: 185,025

[22] Filed: Jan. 24, 1994

[30] Foreign Application Priority Data

Jan. 25, 1993 [JP] Japan ................. 5-009739
Feb. 16, 1993 [JP] Japan ................. 5-026425

[51] Int. Cl.⁶ ............................. G02F 1/1335
[52] U.S. Cl. ............................. 359/40; 359/41; 359/67; 359/70
[58] Field of Search ............ 359/40, 41, 67, 70

[56] References Cited
FOREIGN PATENT DOCUMENTS

| | | |
|---|---|---|
| 62-133424 | 6/1987 | Japan . |
| 1-189685 | 7/1989 | Japan . |
| 2-250015 | 10/1990 | Japan . |
| 2-262185 | 10/1990 | Japan . |
| 2-302726 | 12/1990 | Japan . |
| 3-244286 | 10/1991 | Japan . |
| 5333328 | 5/1992 | Japan ................. 359/41 |
| 4-168424 | 6/1992 | Japan . |
| 4-180475 | 6/1992 | Japan . |
| 6051311 | 8/1992 | Japan ................. 359/40 |
| 4-251221 | 9/1992 | Japan . |
| 5-53101 | 3/1993 | Japan . |

*Primary Examiner*—Anita Pellman Gross
*Assistant Examiner*—Fetsum Abraham
*Attorney, Agent, or Firm*—Parkhurst, Wendel & Rossi

[57] ABSTRACT

A liquid-crystal light valve unit and a projection display system using same are provided. The liquid-crystal light valve includes a light valve having openings defining pixels in a matrix arrangement, first light-reflecting layer for reflecting light projected from a light source entering out of the openings of the light valve, a second light-reflecting layer, including openings in a matrix arrangement, located between the light source and the first light-reflecting layer, for directing the light reflected from the first light-reflecting layer toward the light valve while allowing the light from the light source to be propagated through the openings to the light valve, and a lens array including a plurality of positive lens elements in a matrix arrangement for directing the light from the light source to the second light-reflecting layer, a focal point of each of the positive lens elements being defined on a given area in the vicinity of each of the openings of the second light-reflecting layer. With this arrangement, an effective aperture ratio is increased for projection of bright images.

33 Claims, 19 Drawing Sheets

LIQUID CRYSTAL LIGHT VALVE INCLUDING BETWEEN LIGHT AND LIGHT VALVE MICROLENSES AND TWO REFLECTING LAYERS WITH A MATRIX OF OPENINGS

BACKGROUND OF THE INVENTION

1. Technical Field of the Invention

The present invention relates generally to a light valve apparatus and a display system using same, and more particularly to a liquid-crystal light valve and a projection display system for projecting bright fine images.

2. Background Art

Large-screen projection systems are known in the art wherein optical images are formed on light valves according to image signals and light beams are directed onto the optical images for projection onto a large projection screen through a projection lens. In recent years, there has been proposed a projection display system using liquid-crystal light valves. For example, Japanese Patent First Publication No. 62-133424 to T. Ono et al. discloses a projection display system which utilizes three active matrix liquid crystal panels for three primary colors: red, green, and blue for projecting high-quality images. Each of the active matrix liquid crystal panels is formed with a twisted nematic (TN) liquid crystal and carries thin-film transistors (TFTs) as a switching element for each pixel. In addition, Japanese Patent First Publication No. 2-250015 to T. Tanaka et al. teaches a compact projection display system using TFT liquid crystal panels as disclosed in T. Ono et al. and a translucent projection screen to arrange all optical systems and electric circuits within a small-sized cabinet.

In general, a TFT liquid crystal panel may malfunction when intense light enters a TFT. For avoiding this drawback, a metal thin film black matrix is usually provided on a liquid crystal layer on a light-receiving side glass substrate for isolating the TFT and circuit wiring from the intense light. The TFT liquid crystal panel uses only light passing through the black matrix, and the brightness of projected images is determined in proportion to an aperture ratio of the liquid crystal panel (i.e., an area ratio of all apertures of the black matrix to the entire image-displaying surface). Thus, utilizing light reaching non-aperture portions of the black matrix will increase the brightness of the projected images, resulting in energy efficiency being improved. Accordingly, there has been a prior art approach wherein a lens array plate is arranged adjacent a light-receiving side of a liquid crystal panel for brightening projected images. For example, Japanese Patent First Publication No. 1-189685 to S. Matsuo et al. discloses an arrangement wherein an array of positive lens elements whose each optical axis lies in alignment with an opening of each pixel of a liquid crystal panel, is arranged at a light-receiving side of the liquid crystal panel. In this arrangement, substantially parallel light beams incident to the liquid crystal panel are converted by the positive lens elements into convergent beams which, in turn, pass through the openings of black matrixes with high efficiency as an optical beam diameter becomes smaller at a location of the black matrix. Thus, an effective aperture ratio of the liquid crystal panel is increased as compared with an aperture ratio of the black matrix. In addition, Japanese Patent First Publication No. 2-262185 to H. Hamada proposes an arrangement wherein a lens array plate which includes a transparent plate carrying lens arrays on its both side surfaces for decreasing the cross-sectional diameter of a light beam projected from the light-projecting lens array smaller than the diameter of the lens element of the light-receiving lens array, is arranged at a light-receiving side of a liquid crystal panel for increasing the brightness of projected images.

Projecting fine images using a projection display system including a combination of a TFT liquid crystal panel and a lens array plate requires increasing the number of pixels per unit area of the liquid crystal panel, resulting in pixel pitches being decreased. When light-source real images reduced in size which are formed on the pixels of the liquid crystal panel through the lens array plate are greater in dimension than the pixels, the effective aperture ratio in the case of parallel incident light beams is improved, however, projected images do not become bright. Reducing the size of the light source real images requires shortening the focal length of each of positive lens elements of the lens array plate. This requires use of a thin light-receiving side glass substrate of the liquid crystal panel. However, the thin light-receiving side glass substrate makes it difficult to provide uniform thickness of a liquid crystal layer. For solving this problem, Japanese Patent First Publication No. 2-302726 to Y. Ito et al. teaches the arrangement of lens elements in a light-receiving side glass substrate. The fabrication of a distributed index type lens array using an ion exchange process commonly requires a glass substrate containing alkali ions. This gives rise to a problem related to the deterioration of characteristics of TFTs under the influence of melted alkali ions. In addition, formation of the lens array between two glass substrates requires a combination of the glass substrates having different refractive indexes. Since such glass substrates generally show different coefficients of thermal expansion, it is difficult to uniform the thickness of the liquid crystal layer over a wide temperature range. In either case, as long as positive lens elements are formed inside a light-receiving side glass substrate, it is difficult to display high-quality images on the liquid crystal panel. The prior art approaches have suffered from the drawback in that it is difficult to project bright fine images.

Usually, video cameras require a compact and lightweight body for easy carrying. For reducing the overall size of the camera, the use of a liquid crystal panel in a view finder has been proposed. In addition, display of high-quality images on the liquid crystal panel has been sought. This requires reduction in size of a display screen of the liquid crystal panel with need for a great number of pixels. In other words, it is necessary to decrease pixel pitches in the liquid crystal panel. This arrangement, however, reduces an aperture ratio of the liquid crystal panel, resulting in the brightness of displayed images being reduced. For brightening the displayed images, it is necessary to provide a bright light source, but resulting in consumption of electric power being increased. This also leads to reduction in continuous operating lifetime produced by one-time battery charging.

SUMMARY OF THE INVENTION

It is therefore a principal object of the present invention to avoid the disadvantages of the prior art.

It is another object of the present invention to provide a light valve unit which is designed to provide highly dense pixels with increased effective aperture ratio.

It is a further object of the present invention to provide a display system which is operable to project bright fine images.

According to one aspect of the present invention, there is provided a light valve apparatus which comprises a light valve having openings defining pixels in a matrix arrangement, a first light-reflecting means for reflecting light projected from a light source entering out of the openings of the light valve, a second light-reflecting means, including openings in a matrix arrangement, located between the light source and the first light-reflecting means, for directing the light reflected from the first light-reflecting means toward the light valve while allowing the light from the light source to be propagated through the openings to the light valve, and a lens array including a plurality of positive lens elements in a matrix arrangement for directing the light from the light source to the second light-reflecting means, a focal point of each of the positive lens elements being defined on a given area in the vicinity of each of the openings of the second light-reflecting means.

In the preferred mode, the second light-reflecting means is formed on a light-projecting surface of a first transparent plate arranged on a light-receiving side of the light valve or adjacent the light-projecting surface thereof. The lens array is formed on a light-receiving surface of a second transparent plate arranged on a light-receiving side of the first transparent plate or adjacent the light-receiving surface thereof.

The second light-reflecting means may alternatively be formed on a light-projecting surface of a transparent plate arranged on a light-receiving side of the light valve or adjacent the light-projecting surface thereof. The lens array may also be formed on a light-receiving surface of the transparent plate or adjacent the light-receiving surface thereof.

An optical axis of each of the positive lens elements is oriented to extend through a central portion of each of the openings of the second light-reflecting means.

The positive lens elements of the lens array are in a delta arrangement. Each of the positive lens elements has a regular hexagonal effective area. In addition, the positive lens elements are so arranged that a line extending through centers of the three adjacent positive lens elements defines an equilateral triangle.

The first light-reflecting means is made of an aluminum material. The second light-reflecting means is also made of an aluminum material.

The first light-reflecting means defines the openings of the light valve.

The first light-reflecting means includes a light-reflecting surface. The second light-reflecting means includes a light-reflecting surface which is arranged parallel to the light-reflecting surface of the first light-reflecting means.

According to another aspect of the present invention, there is provided a light valve apparatus which comprises a light valve having openings defining pixels in a matrix arrangement, a first light-reflecting means for reflecting light projected from a light source entering out of the openings of the light valve, a second light-reflecting means, including openings in a matrix arrangement, located between the light source and the first light-reflecting means, for directing the light reflected from the first light-reflecting means toward the light valve while allowing the light from the light source to be propagated through the openings to the light valve, a first lens array of positive lens elements arranged in a matrix arrangement on a light-receiving side of the second light-reflecting means, each of the positive lens elements being in alignment with each of the openings of the second light-reflecting means, a focal point of each of the positive lens elements being defined on a given area in the vicinity of each of the openings of the second light-reflecting means, and a second lens array of positive lens elements each being provided adjacent each of the openings of the second light-reflecting means, a focal point of each of the positive lens elements being defined in the vicinity of a principal point of each of the positive lens elements of the first lens array.

In the preferred mode, a focal length of each of the positive lens elements of the second lens array is substantially the same as that of each of the positive lens elements of the first lens array.

The second lens array is formed on in a light-projecting surface of a first transparent plate arranged on a light-receiving side of the light valve or adjacent the light-projecting surface thereof, the second light-reflecting means being formed on the light-projecting surface of the first transparent plate. The first lens array is formed on a light-projecting surface of a second transparent plate located on a light-receiving side of the first transparent plate or adjacent the light-projecting surface of the second transparent plate.

The second lens array may alternatively be formed on in a light-projecting surface of a transparent plate arranged on a light-receiving side of the light valve or adjacent the light-projecting surface thereof, the second light-reflecting means being formed on the light-projecting surface of the transparent plate. The first lens array may also be formed on a light-receiving surface of the transparent plate or adjacent the light-receiving surface of the transparent plate.

An optical axis of each of the positive lens elements of the first lens array is oriented to extend through a central portion of each of the openings of the second light-reflecting means. An optical axis of each of the positive lens elements of the second lens array is oriented to extend through the central portion of each of the openings of the second light-reflecting means.

The positive lens elements of the first lens array is in a delta arrangement. Each of the positive lens elements of the first lens array has a regular hexagonal effective area. In addition, the positive lens elements of the first lens array are so arranged that a line extending through centers of the three adjacent positive lens elements defines an equilateral triangle.

The first light-reflecting means is made of an aluminum material. The second light-reflecting means is made of an aluminum material.

The first light-reflecting means defines the openings of the light valve.

The first light-reflecting means includes a light-reflecting surface. The second light-reflecting means includes a light-reflecting surface which is arranged parallel to the light-reflecting surface of the first light-reflecting means.

The configuration of an effective area of each of the positive lens elements of the second lens array is substantially the same as that of each of the openings of the second light-reflecting means.

According to a further aspect of the present invention, there is provided a projection display apparatus comprising a light source, a light valve unit responsive to light from the light source to form an optical image according to an image signal, and a projection lens operable to project the optical image on a projection screen. The light valve unit may alternatively be provided with either of the light valve apparatuses as discussed above.

In the preferred mode, each of the positive lens element of the second lens array may be designed for forming an imaginary object located adjacent each of the positive lens elements of the first lens array on a pupil of the projection lens on a side of the light valve.

According to a still further aspect of the invention, there is provided a view finder apparatus which comprises a light source, a light valve unit responsive to light from the light source to form an optical image according to an image signal, and an magnifying lens for magnifying the optical image. The light valve unit may alternatively be provided with either of the light valve apparatus as discussed above.

In the preferred mode, each of the positive lens element of the second lens array may be designed for forming an imaginary object located adjacent each of the positive lens elements of the first lens array on a pupil of the projection lens on a side of the light valve. In addition, the light source includes a lighting means and a condenser lens, the condenser lens being designed to convert light from the lighting means into a light beam having a narrower directivity.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Prior to describing embodiments according to the present invention, a detailed discussion of principles of a liquid-crystal light valve unit of the invention will be given hereinbelow.

Figure 1:
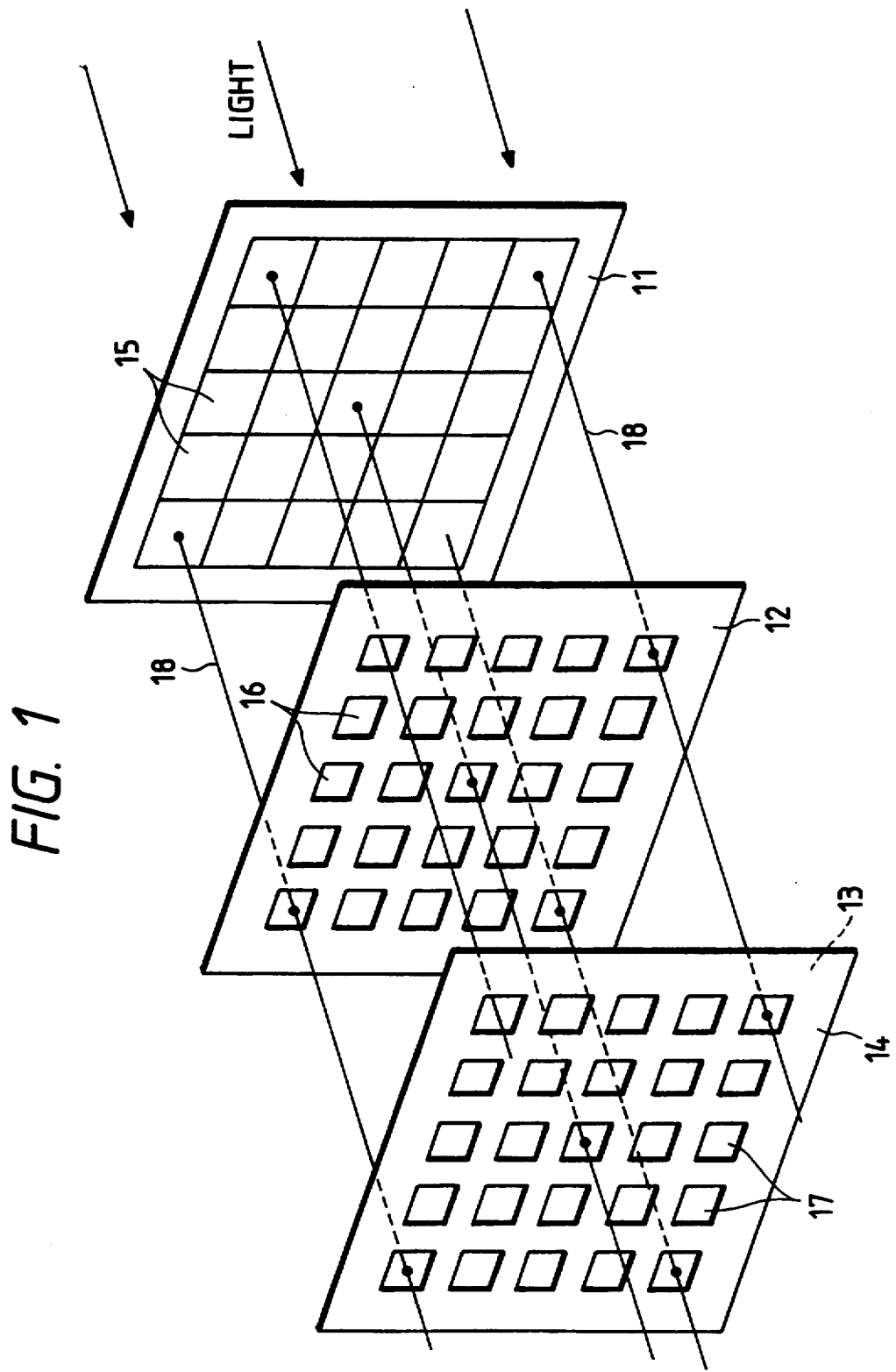
FIG. 1 is a perspective view which shows a first model of a liquid-crystal light valve unit according to the present invention.

FIG. 1 shows a first model of a liquid-crystal light valve unit, as will be explained in more detail hereinafter, according to the invention. The first model includes generally a lens array layer 11, a first light-reflecting layer 13, a second light-reflecting layer 12, and a light-blocking layer 14 which are practically combined into a thin layer. The lens array layer 11 includes a plurality of square positive lens elements 15 in a square matrix arrangement. The second light-reflecting layer 12 includes a plurality of square openings 16 arranged in a square matrix arrangement. The first light-reflecting layer 13 is attached closely to the light-receiving side of the light-blocking layer 14, and includes a plurality of common square openings 17 in a square matrix arrangement. Between the lens array layer 11 and the second light-reflecting layer 12 and between the first and second light-reflecting layers 13 and 12, air layers are formed. An interval or pitch between the centers of the adjacent lens elements 15 of the lens array layer 11 is set equal to that between the adjacent openings 16 of the second light-reflecting layer 12 and that between the adjacent openings 17 of the first light-reflecting layer 13. An optical axis of each of the positive lens elements 15 of the lens array layer 11 is oriented in alignment with the center of each of the openings 16 of the second light-reflecting layer 12 and the center of each of the openings 17 of the first light-reflecting layer 13. Focal points 22, as shown in FIG. 2, of the positive lens elements 15 are defined in given ranges over the centers of the openings 16, preferably on the centers of the openings of the second light-reflecting layer 12, respectively.

Figure 2:
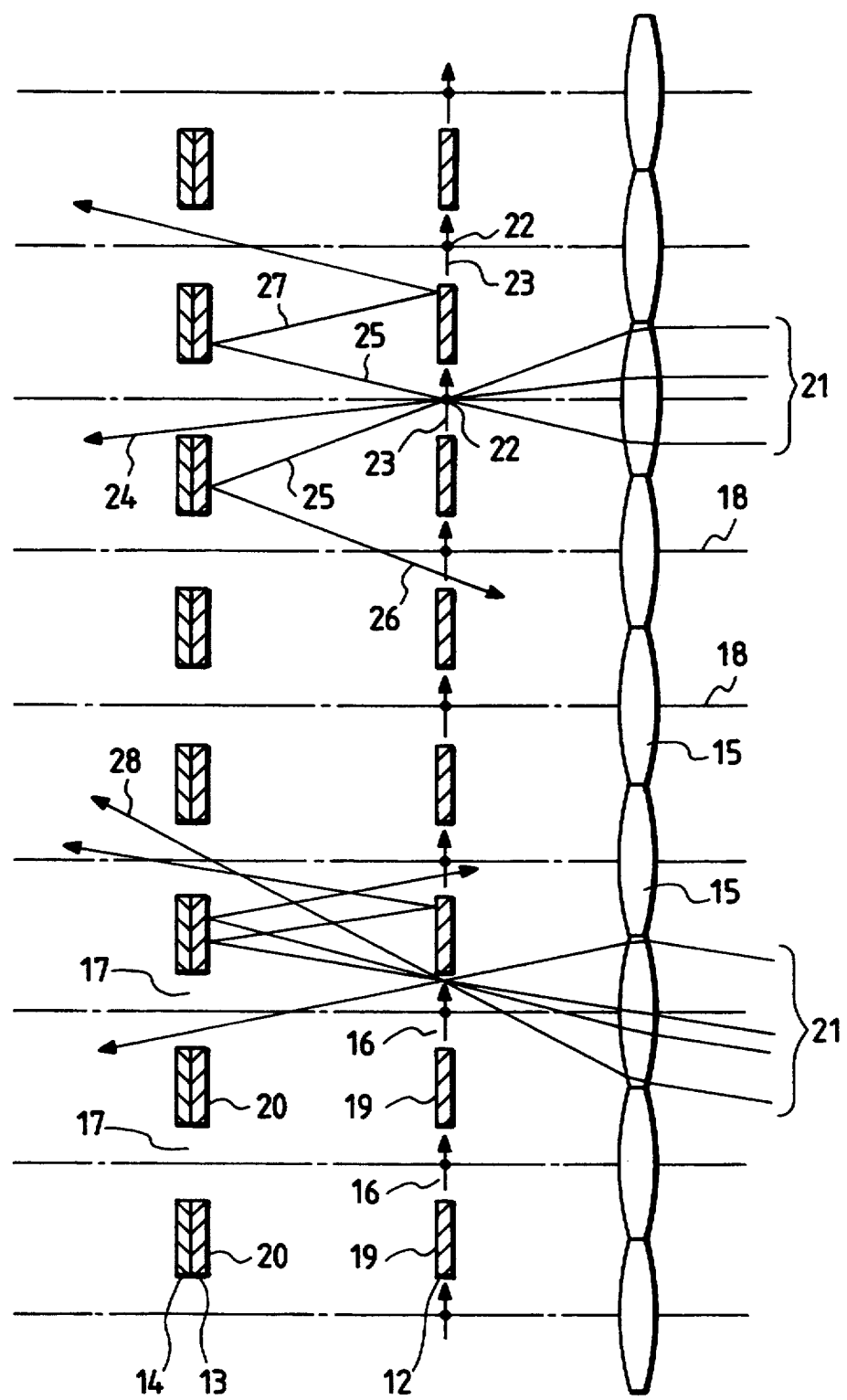
FIG. 2 is a cross-sectional view which shows an optical path in the first model, as shown in FIG. 1.

In operation, when light beams 21, as shown in FIG. 2, enter the lens array layer 11 from a light source (not shown), the positive lens elements 15 will form micro real images 23 of the light source on the focal points 22, respectively so that micro light sources (i.e., the real images 23) are formed at the centers of the openings 16 of the second light-reflecting layer 12 as the focal points 22 of the positive lens elements 15 are, as mentioned above, defined at the centers of the openings 16 of the second light-reflecting layer 12.

The light beams emerging from each of the micro light sources 23 are directed to the first light-reflecting layer 13 through the opening 16 of the second light-reflecting layer 12. Of these light beams, the light beam 24 passes through the opening 17 of the first light-reflecting layer 13 to a light valve layer (not shown), while the light beams 25 travel to adjacent non-aperture areas 20 of the first light-reflecting layer 13. An upper one 27 of the light beams 25 reflected on the non-aperture area 20 is directed to a non-aperture area 19 of the second light-reflecting layer 12, while a lower one 26 of the light beam 25 enters the opening 16 of the second light-reflecting layer 12 which is, in turn, projected toward the lens array layer 11. The light beam 27 reflected by the non-aperture area 19 of the second light-reflecting layer 12 travels through the opening 17 of the first light-reflecting layer 13. In this manner, the light projected from each of the micro light sources 23 repeats reflection between the first and second light-reflecting layers 13 and 12 so that the light arriving at the non-aperture area 20 of the light-blocking layer 14 partially passes through the opening 17. It will be noted that an effective aperture ratio of the liquid-crystal light valve unit of the invention is increased greater than an aperture ratio of the light-blocking layer 14.

Hereinafter, an attempt will be made to explain the effective aperture ratio in the first model, as shown in FIG. 1.

It is assumed that there is no non-lens area on the lens array layer 11, the positive lens elements 15 are all provided with an optimum thin lens of non-aberration whose transmittance is 100%, and both the light-projecting surfaces 19 of the second light-reflecting layer 12 and the light-receiving surfaces 20 of the first light-reflecting layer 13 assume a reflectivity of 100%. An aperture ratio and reflectivity of the second light-reflecting layer 12 are represented by $a_L$, $R_L$, and an aperture ratio and reflectivity of the first light-reflecting layer 13 are represented by $a_B$, $R_B$.

Therefore, of light projected from the micro light sources 23, the quantity of light $a_B$ directly enters the openings 17 of the light-blocking layer 14 without being reflected on the first light-reflecting layer 13, while the remaining light $(1-a_B)$ is reflected by the first light-reflecting layer 13 at the reflectivity of $R_B$, which is, in turn, directed to the second light-reflecting layer 12. The quantity of light incident to the second light-reflecting layer 12 from the first light-reflecting layer 13 may be given by the relation of $(1-a_B) R_B$. In addition, of the light incident to the second light-reflecting layer 12 after having been reflected by the first light-reflecting layer 13, only the quantity of light $(1-a_L) R_L$ is reflected by the second light-reflecting layer 12 at the reflectivity of $R_L$.

Thus, of the light incident to the second light-reflecting layer 12, the quantity of light $(1-a_L) R_L$ travels toward the first light-reflecting layer 13 again. Of this light, the quantity of light $a_B$ passes through the openings 17 of the first light-reflecting layer 13 toward the light valve layer. The light reflection, as explained above, causes the light incident to the liquid-crystal light valve unit to pass partially through the openings 16 of the second light-reflecting layer 12 toward the lens array layer 11, while the remainder thereof is directed to the light valve layer passing through the openings 17 of the first light-reflecting layer 13.

In the light of the multi-reflection of light, as referred to above, an effective aperture ratio $\eta$ of the liquid-crystal light valve unit is determined according to the following relation.

$$\eta = a_B + Q a_B + Q^2 a_B + Q^3 a_B + Q^4 a_B + Q^5 a_B + \ldots \quad (1)$$

where $$Q = (1-a_B)(1-a_L) R_L R_B \quad (2)$$

The above equation (1) may be rewritten as follows:

$$\eta = a_B/(1-Q) \quad (3)$$

Since the aperture ratios $a_B$ and $a_L$ and the reflectivities $R_L$ and $R_B$ are all greater than zero (0) yet smaller than one (1), Q falls in a range from 0 to 1. Therefore, it will be appreciated that the effective aperture ratio $\eta$ of the liquid-crystal light valve unit of the invention becomes greater than the aperture ratio $a_B$ of the light valve itself.

From the above equations (1) and (2), it is found that even when an interval between the first and second light-reflecting layers 13 and 12 is increased, the effective aperture ratio $\eta$ does not change. Accordingly, in the liquid-crystal light valve unit of this invention, it is possible to increase the effective aperture ratio $\eta$ without having to shorten a distance between a light-receiving side surface of the light valve and the light valve layer.

Additionally, it will be apparent from the above equation (3) that, as long as the aperture ratio $a_B$ of the first light-reflecting layer 13 (i.e., the light valve) is fixed, increasing the effective aperture ratio $\eta$ requires increasing Q. This is acknowledged from the equation (2) to be achieved by increasing $R_L$ and $R_B$, while decreasing $a_L$. When an area of the openings 16 of the second light-reflecting layer 12 is reduced, $a_L$ will decrease. However, when the openings 16 are smaller in size than the micro light sources 23, it will cause the light quantity passing through the openings 16 to be reduced. Therefore, it should be noted that for decreasing $a_L$, the micro light sources 23 be minimized in size, and the area of the openings 16 of the second light-reflecting layer 12 be set equal to that of the micro light sources 23.

The reduction in size of the micro light sources 23 requires minimizing the aberration created by the positive lens elements 15 of the lens array layer 11. Usually, as the numerical aperture is increased, the spherical aberration becomes great. Therefore, the configuration of an effective area of the positive lens elements 15 should preferably be of a circle. In addition, when there is an ineffective area on the lens array layer 11, it will decrease the effective aperture ratio $\eta$. It is thus, desired that a lens aperture ratio of the lens array layer 11 (i.e., a ratio of the total of the effective area of the positive lens elements 15 to the entire area of the lens array layer 11) be maximized.

Further, when the second light-reflecting layer 12 does not lie parallel to the first light-reflecting layer 13, it will cause an angle defined between the light projected from each of the positive lens elements 15 of the lens array layer 11 and the optical axis 18 to be increased as the light repeats reflection. This results in the light emerging from the liquid-crystal light valve unit being spread greatly, and also leads to the variation in quantity of light incident to each pixel (i.e., the opening 17) of the light valve and the variation in projecting angle of the light. For these reasons, it is essential to orient the first and second light-reflecting layers 13 and 12 parallel to each other.

Figure 3C:
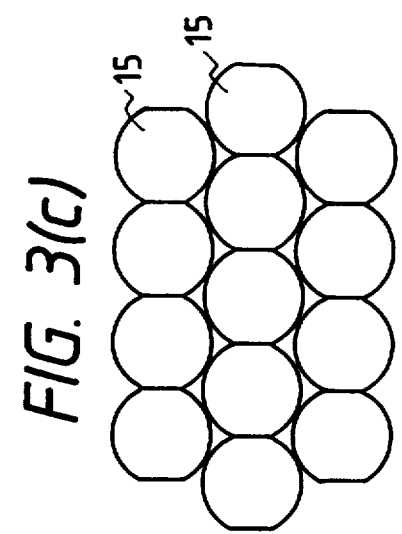
FIGS. 3(a), 3(b), 3(c), 3(d), and 3(e) show examples of a lens array of a liquid-crystal light valve unit according to the first model, as shown in FIG. 1.
Figure 3B:
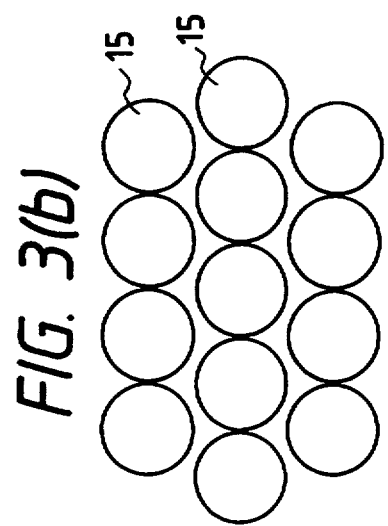
Figure 3E:
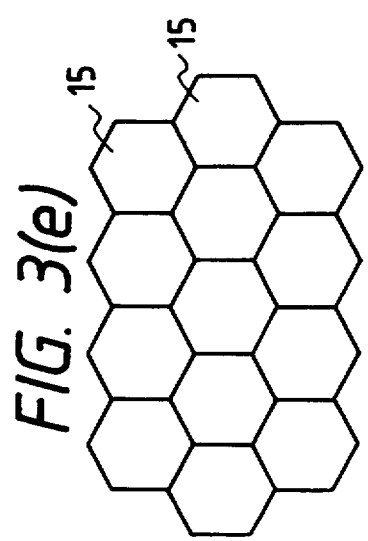
Figure 3A:
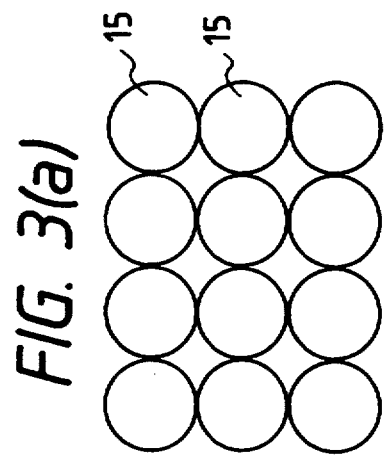

The positive lens elements 15 of the lens array layer 11 may be, as shown in FIGS. 3(a) to 3(e), arranged in various fashions. FIG. 3(a) shows a square matrix arrangement of circular lens elements. FIG. 3(b) shows a delta arrangement of circular lens elements. The lens aperture ratios of the arrangements, as shown in FIGS. 3(a) and 3(b), are the same. In the case of the delta arrangement, the positive lens elements 15 may be, as shown in FIG. 3(c), arranged to extend vertically so that the lens aperture ratio is increased.

Figure 3D:
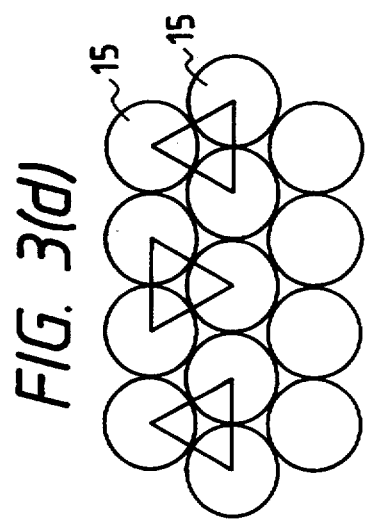

When the circular positive lens elements 15 are arranged closely to each other in the delta arrangement, it is desirable that intervals among the centers of three adjacent positive lens elements 15 be set equal to each other. In other words, line extending through the centers of the three adjacent positive lens elements 15 should preferably define an equilateral triangle. Even when the positive lens elements 15 are not circular, the positional relation, as shown in FIG. 3(d), provides an increased lens aperture ratio. Further, in order to maximize the lens aperture ratio in the delta arrangement, the positive lens elements 15 should desirably be formed with regular hexagonal lens elements, respectively. In this case, there is no non-lens area on the lens array layer 11 and incoming light may be utilized completely. Thus, projected images become brighter than an arrangement having the circular positive lens elements.

Figure 4:
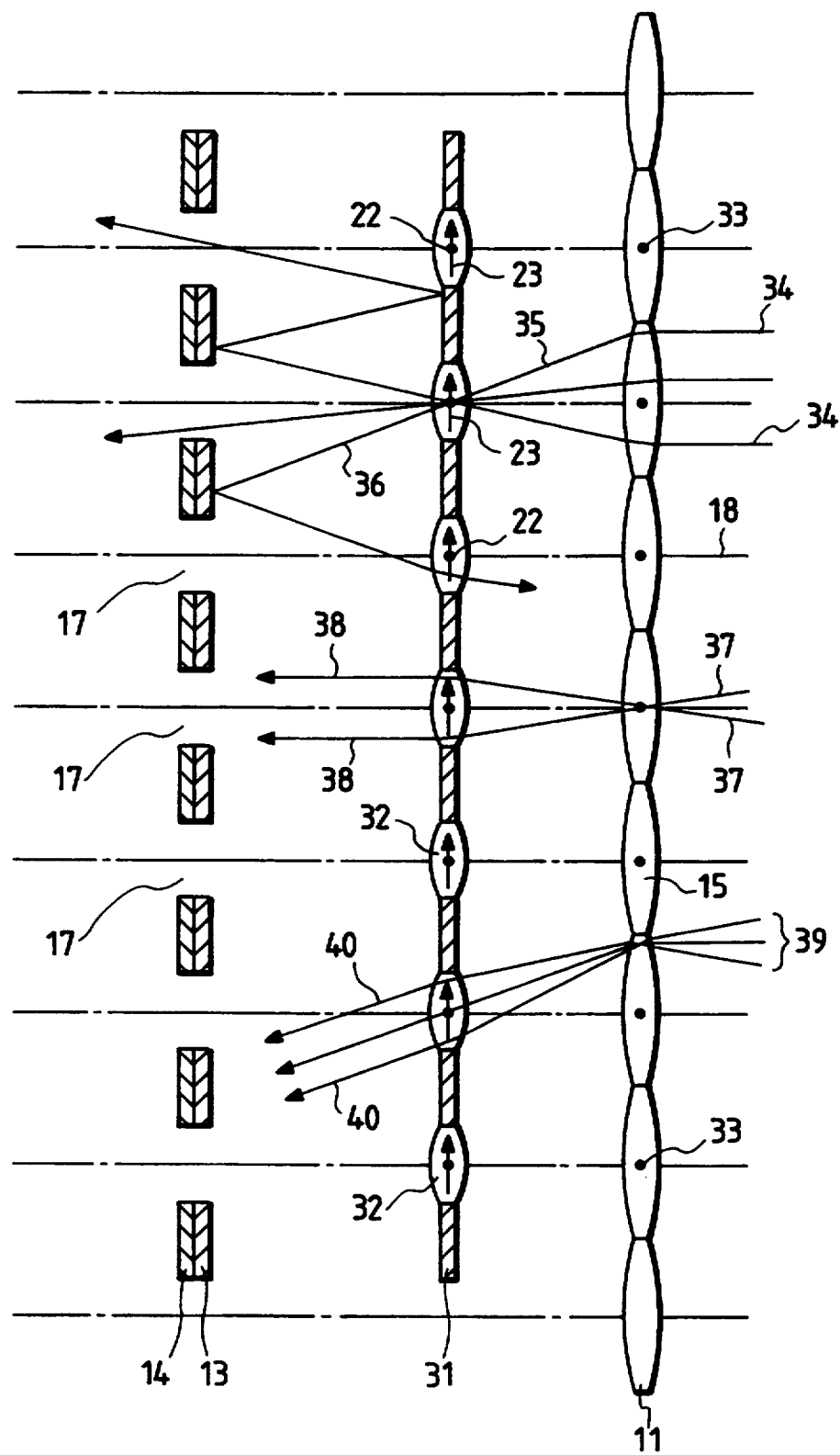
FIG. 4 is a cross-sectional view which shows an optical path in a second model of a liquid-crystal light valve unit according to the invention.

Referring to FIG. 4, there is shown a second model of the liquid-crystal light valve unit according to the present invention. The second model is different from the first model, as shown in FIGS. 1 and 2 in that a second lens array layer 31 is arranged at a location where the second light-reflecting layer 12 is to be placed. Other arrangements are the same as the first model and explanation thereof in detail will be omitted here.

The second lens array layer 31 includes a plurality of positive lens elements 32 which are in a square matrix arrangement in alignment with the openings 17 of the first light-reflecting layer 13 and the positive lens elements 15 of the first lens array layer 11. In addition, the positive lens elements 32 of the second lens array layer 31 are so arranged as to define their focal points 33 on principal planes of the positive lens elements 15 of the first lens array layer 11, respectively.

In the second model, micro light sources 23 are, similar to the first model, formed on the central areas of the lens elements 32 of the second lens array layer 31, and the effective aperture ratio is higher than the aperture ratio of the light-blocking layer 14.

In operation, since the focal point 22 of each of the positive lens elements 15 of the first lens array layer 11 is defined near the center of each of the positive lens elements 32 of the second lens array layer 31, when the light beams 34 parallel to the optical axis 18 enter the first lens array layer 11, all the projected light beams 35 therefrom pass near the center of each of the positive lens elements 32. The light beams 36 from the positive lens elements 32 travels in alignment with the light beams 35 entering the positive lens elements 32. It will be appreciated that a maximum angle between each of the light beams 36 and the optical axis 18 is, thus, determined by a light beam passing through the edge of the positive lens element 15.

Additionally, the focal points 33 of the positive lens elements 32 of the second lens array layer 31 are defined near the centers of the positive lens elements 15 of the first lens array layer 11, respectively. When the light beams 37 passing through the center of the positive lens element 15 enter the second lens array layer 31, they will be oriented parallel to the optical axis 18 so that light beams 38 are projected from the lens elements 32. In addition, when the light beams passing near the periphery of the positive lens element 15 of the first lens array layer 11 enter the second lens array layer 31, they will be oriented parallel to each other so that parallel light beams 40 are projected from the lens elements 32. It will be noted that a maximum angle between the light beam 40 and the optical axis 18 is determined by the light beam passing through the edge of the positive lens element 15.

In the first model of the liquid-crystal light valve unit, as shown in FIG. 2, the light beam 28 passes through the edge of the positive lens element 15 and the edge of the opening 16 at an extremely great angle to the optical axis 18. In other words, light projected from the liquid-crystal light valve unit spreads wider than an arrangement without the lens array layer 11. The first model of the liquid-crystal light valve unit thus, requires a great numerical apertures of a projection lens. In contrast, in the second model of the liquid-crystal light valve unit, a maximum angle between the light beam projected from the positive lens element 32 of the second lens array layer 31 and the optical axis 18 becomes smaller than that in an arrangement without the second lens array layer 31. The second model of the liquid-crystal light valve unit therefore, makes it possible to use a projection lens having a smaller numerical aperture than that in the first model of the liquid-crystal light valve unit.

When the second model of the liquid-crystal light valve unit is employed in a projection display system or a view finder of such as a video camera, effectively utilizing the light beams projected from each of the positive lens elements of the first lens array layer 11 through a projection lens or a magnifying lens requires forming through the positive lens elements of the second lens array an image of an imaginary object on a principal plane of each of the positive lens elements 15 of the first lens array layer 11 on a pupil of the projection lens or the magnifying lens facing the light valve.

While in the above arrangements, the pixels (i.e., the openings 17) of the light valve are arranged in a square matrix, and the optical axis of each of the positive lens element of the lens array layer extends through the center of each of the openings of the second light-reflecting layer and/or the center of each of the openings of the first light-reflecting layer, the liquid-crystal light valve unit of the invention is not limited to same. For example, when the pixels of the light valve are in the delta arrangement or the orientation of the optical axis is different from the above described arrangements, as long as the micro light sources formed by the positive lens elements of the lens array layer are produced in the openings of the second light-reflecting layer, desirable effects which the present invention is aimed at achieving, are obtained. Therefore, when the liquid-crystal light valve unit, as stated above, is employed in the projection display system or the view finder, bright images may be displayed.

Figure 5:
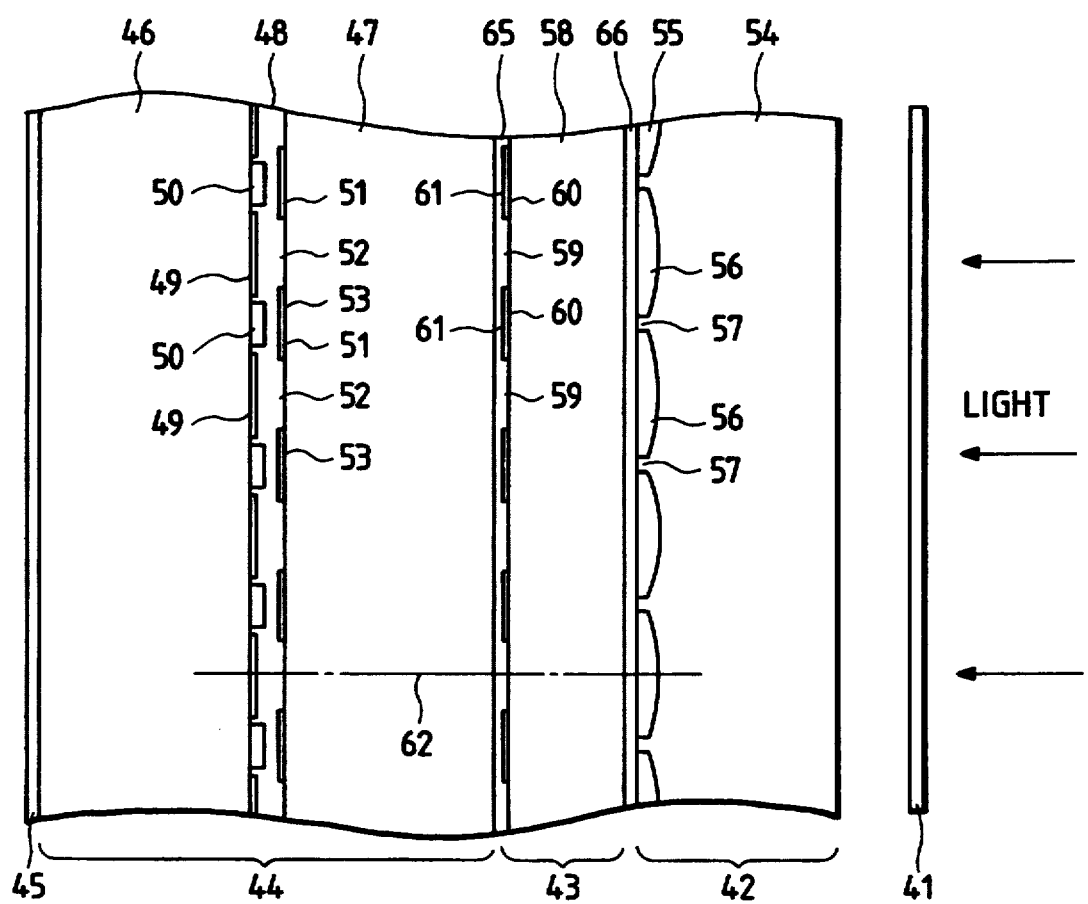
FIG. 5 is an enlarged cross-sectional view which shows essential part of a liquid-crystal light valve unit according to a first embodiment of the invention.

Referring to FIG. 5, there is shown a liquid-crystal light valve unit of a first embodiment according to the present invention.

The liquid-crystal light valve unit includes generally a light-receiving side polarizing plate 41, a lens array plate 42, a mirror plate 43, a liquid crystal panel 44, and a light-projecting side polarizing plate 45.

The liquid crystal panel 44 includes two glass substrates 46 and 47 and a twisted nematic (TN) liquid crystal sandwiched between the glass substrates 46 and 47 to form a liquid crystal layer 48. The glass substrates 46 and 47 both have a thickness of 1.1 mm and assume a refractive index of 1.52, and their both surfaces are polished. On the surface of the glass substrate 46 facing the liquid crystal layer 48, pixel electrodes 49 made of a transparent conductive film are formed in a matrix arrangement. A plurality of thin film transistors (TFTs) 50 serving as a switching element are arranged adjacent the pixel electrodes 49, respectively. Between the adjacent pixel electrodes 49, signal and scanning lines extend. Each of the TFTs 50 has a source electrode, a gate electrode, and a drain electrode. The source electrode is connected to the signal line, the gate electrode is connected to the scanning line, and the drain electrode is connected to the pixel electrode 49. On the surface of the glass substrate 47 facing the liquid crystal layer 48, a common electrode made of a transparent conductive film is formed. A black matrix 51 is provided on the common electrode for covering the TFTs 50 and the signal and scanning lines. The black matrix includes a plurality of openings 52 each defining a pixel. A light-receiving side surface 53 of the black matrix 51 has a reflectivity of 90%. On the pixel electrodes and the common electrode, an orienting film is coated by a rubbing process for orienting liquid crystal molecules to a given condition. In operation, when portions of the liquid crystal layer 48 corresponding to the pixels 52 are subjected to the electric filed generated through a signal supply circuit and a scanning circuit, it will cause optical rotatory power of the liquid crystal layer 48 to change according to the degree of the electric field so that an optical image is displayed on the liquid crystal panel 44 according to an image signal. This optical image is changed in transmittance by activities of the polarizing plates 41 and 45.

The lens array plate 42 is formed with a glass substrate 54 on which an array of lens elements 55 are provided. The lens array 55 includes a matrix of distributed index positive lens elements 56. The glass substrate 54 has a thickness of 1.1 mm and assumes a refractive index of 1.52. The focal length of each of the positive lens elements 56 is 270 $\mu$m. The lens array plate 42 is formed in the following ion exchange process. A metal film is first deposited on a surface-polished glass substrate containing alkali ions, after which openings are formed in the metal film by etching. The glass substrate thus constructed is subjected to heat in solution containing metal ions showing a high refractive index. The alkali ions are then exchanged with the metal ions through the openings to establish refractive index distributions so that the positive lens elements 56 are formed. Finally, the metal film is removed from the glass substrate, and the surface of the glass substrate in which the lens array 55 is formed is polished.

The mirror plate 43 is formed with a glass substrate 58 which arranges on its light-projecting side surface a light-reflecting film 60 including a plurality of openings 59. The light-reflecting film 60 is formed by depositing an aluminum film on the glass substrate 58. The openings 59 are formed by etching the deposited aluminum film. The glass substrate 58 has a thickness of 0.4 mm and assumes a refractive index of 1.52. Light-projecting side surfaces 61 of non-aperture portions show a reflectivity of 90%.

Figure 6:
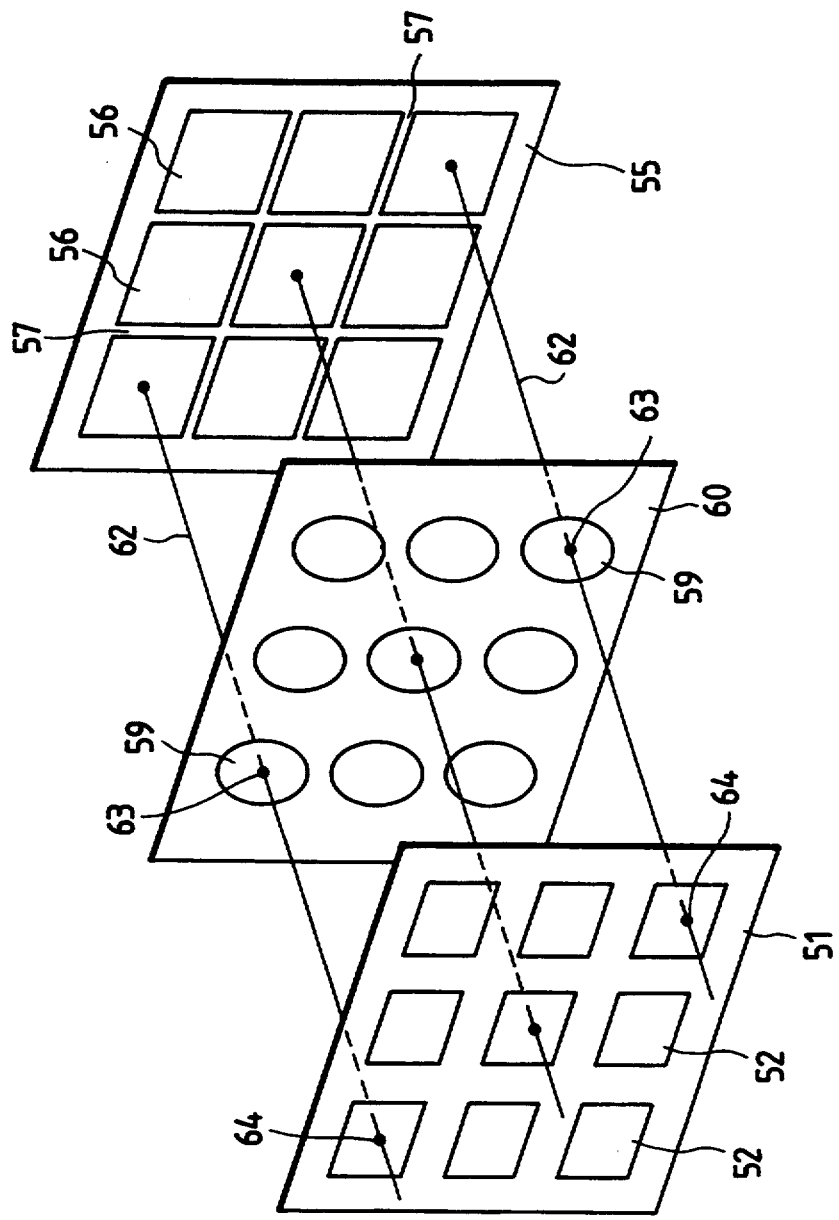
FIG. 6 is a perspective view which shows arrangement of elements of the liquid-crystal light valve unit, as shown in FIG. 5.

The thus-constructed mirror plate 43 is attached to the glass substrate 47 of the liquid crystal panel 44 using a transparent adhesive material 65. In addition, the lens array plate 42 is bonded on the mirror plate 43 with a transparent adhesive material 66. The polarizing plate 41 is, as seen in the drawing, separated from the lens array plate 42, while the polarizing plate 45 is attached to the glass substrate 46 of the liquid crystal panel 44. 15 FIG. 6 shows the arrangement of the lens array 55, the light-reflecting film 60, and the black matrix 51. The black matrix 51 is provided with a square array of the rectangular openings 52 each having a 53 $\mu$m × 32 $\mu$m area. The openings 52 define a matrix of 480 horizontal pixels and 460 vertical pixels. A horizontal pixel pitch is 94 $\mu$m, while a vertical pixel pitch is 73 $\mu$m. The aperture ratio is 25%. In the lens array 55, the positive lens elements 56 have a rectangular effective area. The positive lens elements 56 are arranged away from each other by a pitch which is the same as that between the pixels of the liquid crystal panel 44 to define non-lens portions 57 having a width of approximately 5 $\mu$m. The light-reflecting film 60 includes a square matrix of the circular openings 59 each having a diameter of 60 $\mu$m which are separate from each other by a pitch which is the same as that between the pixels of the liquid crystal panel 44. The lens array 55, the light-reflecting film 60, and the black matrix 51 are so arranged parallel with each other that an optical axis 62 of each of the positive lens elements 56 of the lens array 55 extends through the center 63 of each of the openings 59 of the light-reflecting film 60 and the center 64 of each of the openings 52 of the black matrix 51.

In operation, when light from a light source (not shown) enters the lens array plate 42, a micro real image corresponding to an opening of the light source is formed on a focal point of each of the positive lens elements 56 to provide a micro light source. The focal point of each of the positive lens elements 56 is defined in the corresponding opening 59 of the light-reflecting film 60 for providing therein the micro light source. When light from the micro light source is incident to the liquid crystal panel 44, part of the light passes through the corresponding opening 52 toward the liquid crystal layer 48, while the remainder thereof arrives at the black matrix 51 and then is reflected thereby back to the light-reflecting film 60 of the mirror plate 43. The light-reflecting film 60 then directs same to the liquid crystal layer 48 again. Therefore, with this arrangements, the effective aperture ratio of the liquid-crystal light valve unit, as already discussed in FIGS. 1 to 4, becomes greater than that of the black matrix 51.

In an arrangement using a conventional lens array, increasing the effective aperture ratio of a liquid-crystal light valve unit on which pixels are arranged at smaller pitches requires use of a thin light-receiving side glass substrate. The liquid-crystal light valve unit of the invention, however, eliminates the need for such a thin light-receiving side glass substrate, and thus, uniformity of width of the liquid crystal layer 48 is established. This makes it possible to display high-quality and bright images on the liquid crystal panel 44.

Additionally, it is possible to make a surface of the distributed index lens flat. Therefore, the mirror plate 43 and the lens array plate 42 bonded to each other by a transparent adhesive material has the advantage of considerably reducing a reflection loss on an interface where there is the difference in refractive index. Further, a combination of the lens array plate 42 and the mirror plate 43 provides high mechanical strength even when either of them is very thin.

Figure 7:
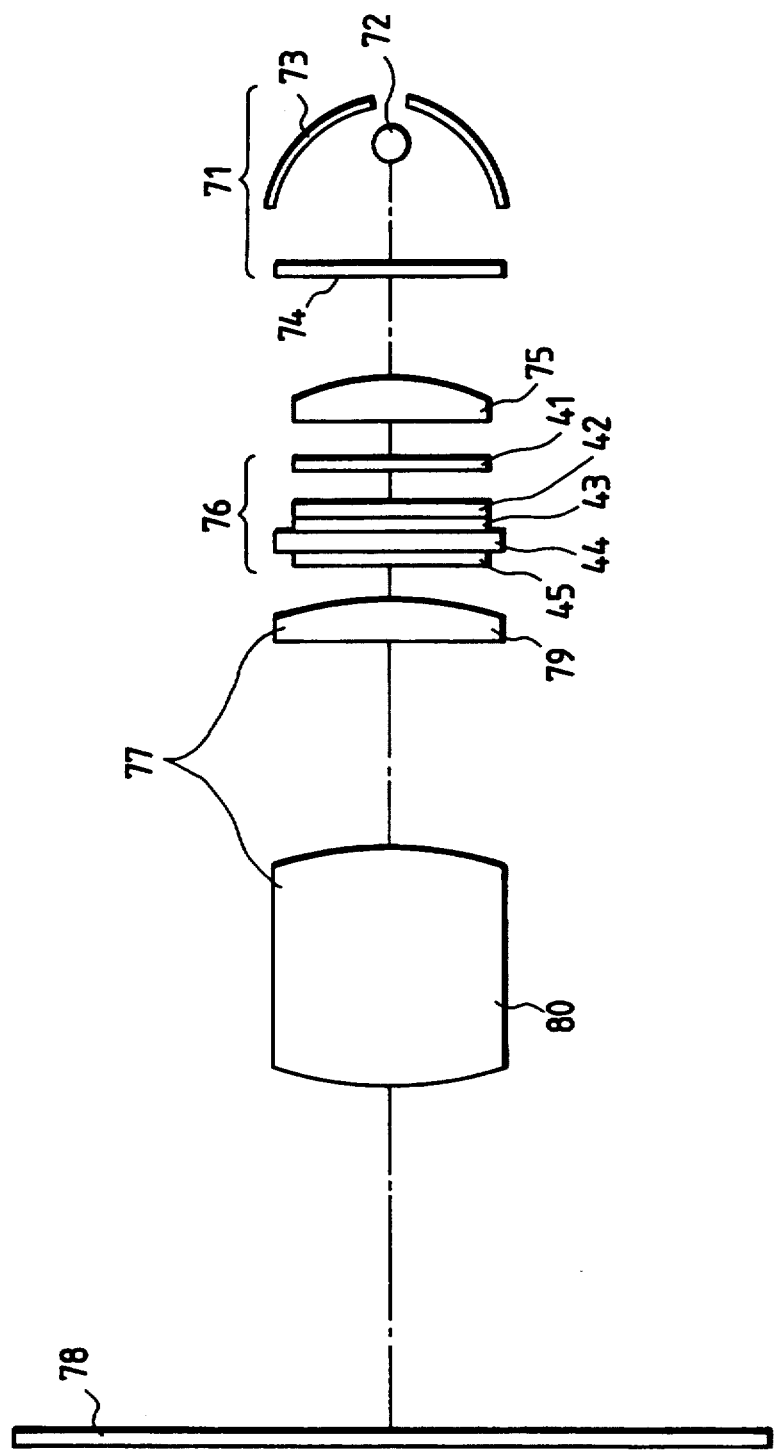
FIG. 7 is a cross-sectional view which shows a projection display system using a liquid-crystal light valve unit according to the present invention.

Referring to FIG. 7, there is shown a projection display system according to the present invention.

The projection display system includes generally a light source 71, a liquid-crystal light valve unit 76, a projection lens system 77, and a projection screen 78.

The light source 71 includes a lamp 72, a concave mirror 73, and a filter 74. The lamp 72 is provided with a tungsten halogen lamp. Light radiating from the lamp 72 is reflected by the concave mirror 73 to project parallel light toward the filter 74. The filter 74 includes a glass substrate carrying thereon multi-layers which allows visible light to be propagated therethrough while reflecting infrared radiation so that the infrared radiation contained in the light projected from the concave mirror 73 is removed.

The light from the light source 71 passes through a field lens 75 toward the liquid-crystal light valve unit 76. All the light projected from the liquid-crystal light valve unit 76 is directed to the projection lens system 77. The liquid-crystal light valve unit 76 has the same construction as shown in FIGS. 5 and 6, and forms an optical image as a result of change in transmittance according to an image signal. The optical image formed on the liquid-crystal light valve unit 76 is projected onto the projection screen 78 through the projection lens system 77 so that a magnified monochromatic image is displayed on the projection screen 78. The field lens 75 is arranged to direct principal rays incident from the light source 71 to the pixels around the periphery of the liquid crystal panel 44 toward an entrance pupil of the projection lens system 77. The projection lens system 77 includes an auxiliary lens 79 facing the liquid-crystal light valve unit 76 and a main projection lens 80 facing the projection screen 78. The auxiliary lens 79 is designed to orient all principal rays passing through the pixels of the liquid crystal panel 44 in a direction perpendicular to the liquid crystal layer. The projection lens system 77 has an aperture ratio of F3.0. The light incident to the liquid-crystal light valve unit 76 has an aperture ratio of F5.0. The lens array plate 42 and the mirror plate 43 increase the effective aperture ratio of the liquid-crystal light valve unit 76 above that of the liquid crystal panel 44. This results in bright images being projected and the efficiency of light-utilization being improved.

Additionally, brightness-tests were performed with respect to a combination of the lens array plate 42 and the mirror plate 43. The test results show that the combination of the lens array plate 42 and the mirror plate 43 is effective to project an image whose central area is 1.2 times as bright as an arrangement without such a lens array plate. The liquid crystal panel 44 has an aperture ratio of 20%, and an effective aperture ratio derived according the above equation (3) is 46%.

Figure 8:
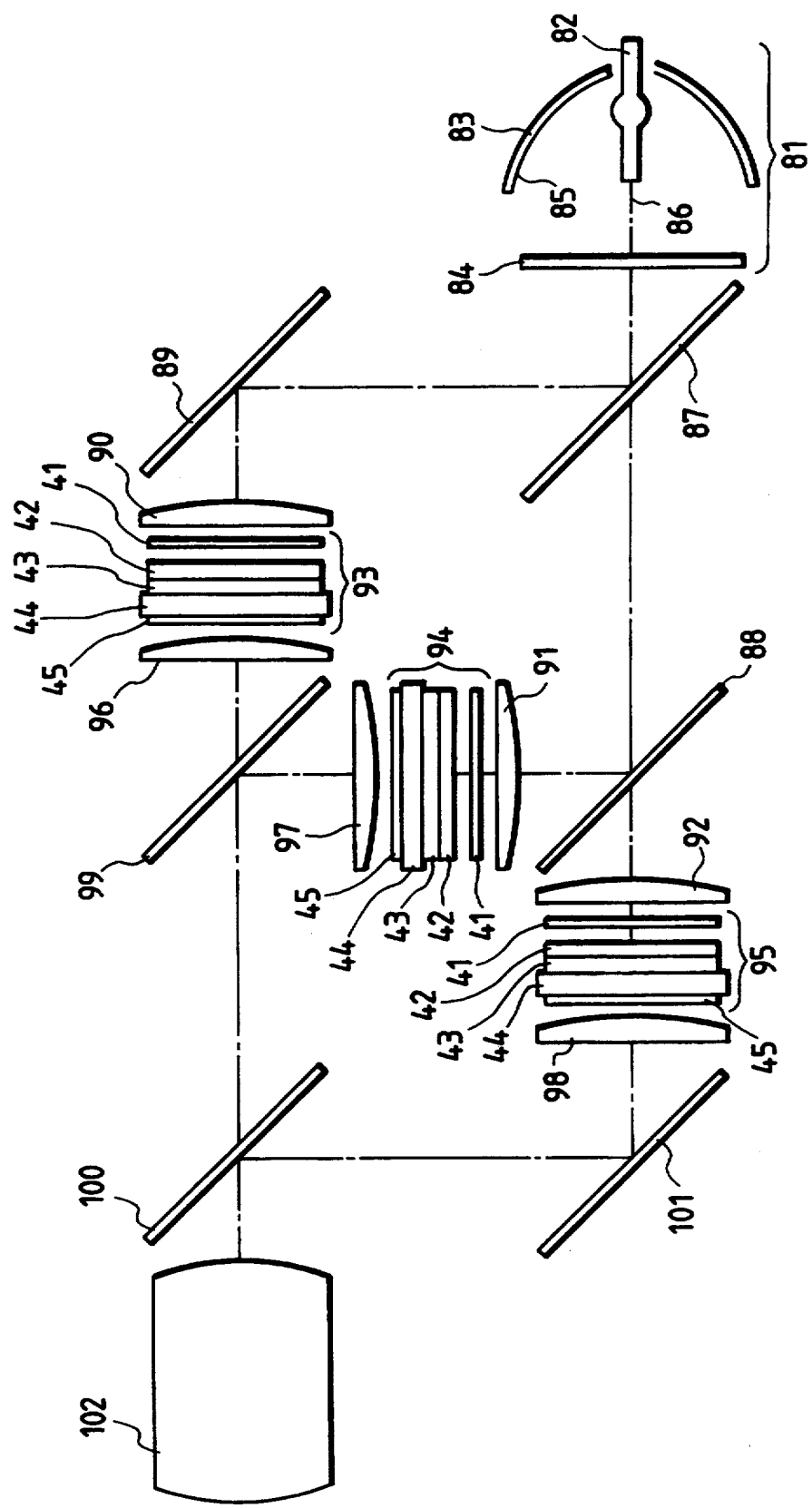
FIG. 8 is a cross-sectional view which shows a projection display system of an alternative embodiment according to the present invention.

Referring to FIG. 8, there is shown a projection display system according to an alternative embodiment of the invention.

The projection display system of this embodiment includes generally a light source 81, three liquid-crystal light valve units 93, 94, and 95, and a main projection lens 102.

The light source 81 includes a lamp 82, a concave mirror 83, and a filter 84. The lamp 82 is provided with a metal halide lamp operable to project light containing color components of three primary colors for a full color image. The concave mirror 83 is made of a glass material, and has a reflecting parabolic surface 83 on which multi-layers are deposited for allowing infrared radiation to be transmitted therethrough while reflecting visible light forward. The filter 84 includes a glass substrate on which multi-layers are formed which are designed to allow visible light to be propagated therethrough while reflecting both ultraviolet radiation and infrared radiation. An optical axis 86 of the concave mirror 83 is oriented horizontally. The lamp 82 is so arranged as to align its center line with the optical axis 86. The light from the lamp 82 is reflected on the concave mirror 83 so that substantially parallel light from which the ultraviolet radiation is partially removed is directed to the filter 84. The filter 84 removes the ultraviolet radiation and the infrared radiation from the incoming light completely to project the visible light. This visible light is separated by a color separation optical system provided with two dichroic mirrors 87 and 88 and a plane mirror 89 into three primary color (red, green and blue) beams. These color beams then pass through field lenses 90, 91, and 92 to the liquid-crystal light valve units 93, 94, and 95, respectively.

Each of the liquid-crystal light valve units 93, 94, and 95 is the same as shown in FIGS. 5 and 6, and includes the polarizing plate 41, the lens array plate 42, the mirror plate 43, the liquid crystal panel 44, and the polarizing plate 45. The liquid-crystal light valve units 93, 94, and 95 are designed to form an optical image as a result of change in transmittance according to an image signal, respectively. The light beams projected from the liquid-crystal light valve units 93, 94, and 95 are directed to auxiliary lenses 96, 97, and 98, respectively and then enter a color composition optical system which includes a combination of dichroic mirror 99 and 100 and a plane mirror 101. The color composition optical system then recombines the incoming light beams into a single beam, directing it toward the main projection lens 102.

The main projection lens 102 functions as a projection lens element in combination with the auxiliary lenses 96, 97, and 98. The auxiliary lenses 96, 97, and 98 are employed to have a principal ray of the main projection lens 101 pass the liquid crystal layers perpendicularly, or to improve telecentric characteristics. With these arrangements, individual color images formed on the liquid-crystal light valve units 93, 94, and 95 are recombined to form a full color image on a projection screen (not shown) located away from the main projection lens 102.

Figure 9:
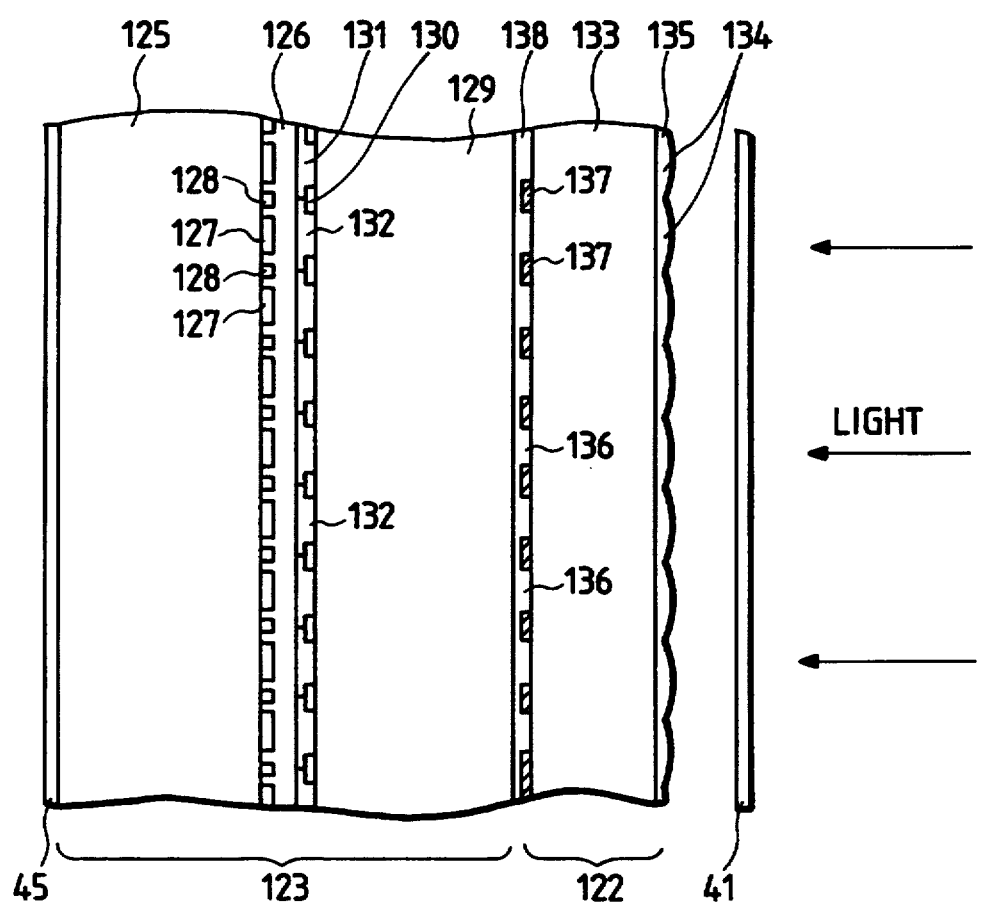
FIG. 9 is an enlarged cross-sectional view which shows essential part of a liquid-crystal light valve unit according to a second embodiment of the invention.

Referring to FIG. 9, there is shown a liquid-crystal light valve unit of a second embodiment. This liquid-crystal light valve unit includes generally a polarizing plate 41, a lens array plate 122, a liquid crystal panel 123, and a polarizing plate 45.

The liquid crystal panel 123, similar to the one shown in FIG. 5, includes two glass substrates 125 and 129 and a TN liquid crystal sandwich therebetween to form a liquid crystal layer 126. Pixel electrodes 127 and TFTs 128 are arranged on a surface of the glass substrate 125 facing the liquid crystal layer 126. On a surface of the glass substrate 129 facing the liquid crystal layer 126, a black matrix 130 is formed for blocking light to the TFTs 128. A tessellated color filter 131 is formed on the black matrix 130 for projection of a full color image. On the color filter 131, a common electrode is arranged. The glass substrate 129 has a thickness of 1.1 mm and assumes a refractive index of 1.52. The black matrix 130 is formed with an aluminum film and its light-receiving side surface has a reflectivity of 90%.

The lens array plate 122 is formed with a glass substrate 133 on a light-receiving surface of which an array 135 of positive lens elements 134 are provided. On a light-projecting side surface of the glass substrate 133, a light-reflecting film 137 is formed which includes a plurality of openings 136. The glass substrate 133 has a thickness of 0.5 mm and shows a refractive index of 1.52. The lens array 135 is formed in a manner wherein an ultraviolet-hardened resin is first coated on the light-receiving side surface of the glass substrate 133 surface-polished, a given pattern for a lens array to be formed is placed thereon, and the ultraviolet-hardened resin-coated surface is subjected to ultraviolet radiation. Each of the positive lens elements 134 has a focal length of 340 $\mu$m. Additionally, the light-reflecting film 137 is formed in a manner wherein an aluminum film is deposited on the light-projecting surface of the glass substrate 133, and it is etched to form the openings 136.

The lens array plate 122 is attached to the glass substrate 129 of the liquid crystal panel 123 using a transparent adhesive material.

Figure 10:
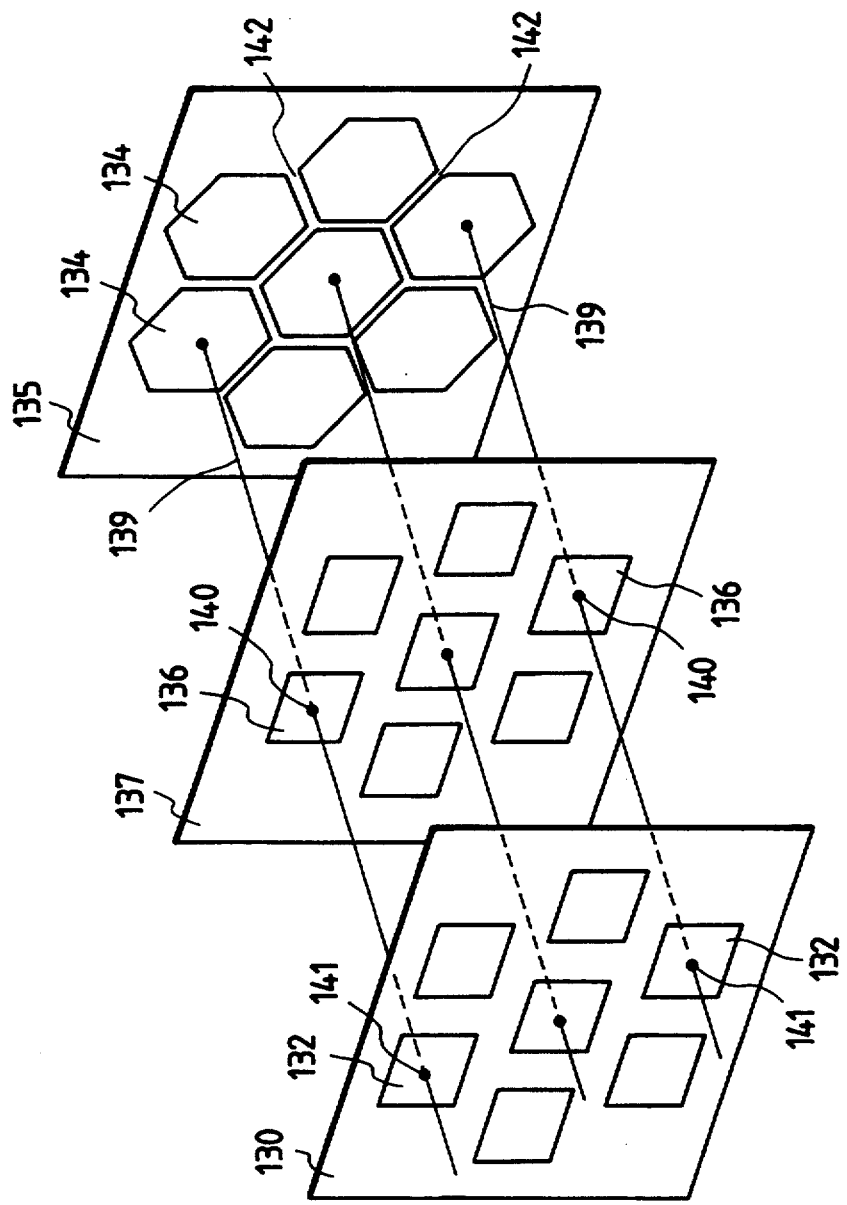
FIG. 10 is a perspective view which shows arrangement of elements of the liquid-crystal light valve unit, as shown in FIG. 9.

FIG. 10 shows the arrangement of the lens array 135, the light-reflecting film 137, and the black matrix 130. All the elements of the lens array 135, the light-reflecting film 137, and the black matrix 130, as clear from the drawing, are arranged in the delta arrangement. An optical axis 139 of each of the positive lens elements 139 of the lens array 135 is oriented to extend through the center 140 of each of the openings 136 of the light-reflecting film 137 and the center 141 of each pixel 132 of the black matrix 130. The black matrix 130 is practically provided with a matrix of 240 horizontal pixels and 300 vertical pixels. A horizontal pixel pitch is 128 $\mu$m, while a vertical pixel pitch is 77 $\mu$m. Each of the pixels 132 is defined by a 64 $\mu$m horizontal side and a 40 $\mu$m vertical side, and has an aperture ratio of 25%. Each of the positive lens elements 134 has a hexagonal effective area. Between the adjacent lens elements 134, non-lens portions 142 having a width of 5 $\mu$m are formed. The light-reflecting film 137 includes an array of rectangular openings 136 each having a 61 $\mu$m horizontal side and a 48 $\mu$m vertical side.

The above arrangement, similar to the above embodiments, is effective to improve the effective aperture ratio greatly using the lens array 122. The efficiency of light-utilization is thus, enhanced greatly so that bright images are projected.

The liquid-crystal light valve unit, as shown in FIG. 9, is applicable to the projection display system, as shown in FIG. 7, for projecting a full color image. This arrangements provides the projected image having a central area 1.2 times as bright as that produced by an arrangement without a lens array plate.

Figure 11:
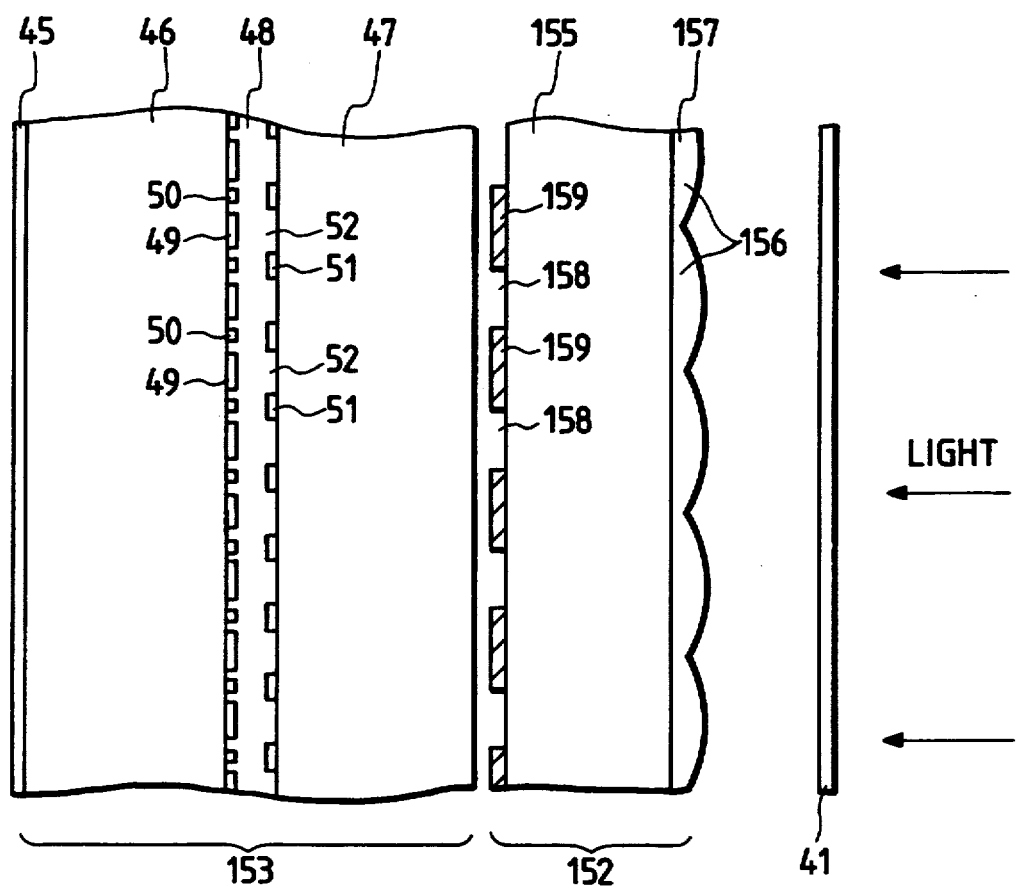
FIG. 11 is an enlarged cross-sectional view which shows essential part of a liquid-crystal light valve unit according to a third embodiment of the invention.

Referring to FIG. 11, there is shown a liquid-crystal light valve unit of a third embodiment according to the invention. This liquid-crystal light valve unit includes a light-receiving side polarizing plate 41, a lens array plate 152, a liquid crystal panel 153, and a light-projecting side polarizing plate 45.

The liquid crystal panel 153, similar to the one shown in FIG. 5, includes two glass substrates 46 and 47 and a TN liquid crystal sandwich therebetween to form a liquid crystal layer 48. On a surface of the glass substrate 47 facing the liquid crystal layer 48, a black matrix 51 is formed. The lens array plate 152 is the same as shown in FIG. 9, and includes a glass substrate 155 on a light-receiving surface of which an array 157 of positive lens elements 156 are provided. On a surface of the glass substrate 155 facing with the liquid crystal panel 153, a light-reflecting film 159 is formed which includes a plurality of openings 158. Each of the positive lens elements 156 is of a square, and a pitch between the adjacent lens elements is set much greater than that, as shown in FIG. 9. The glass substrate 155 has a thickness of 0.7 mm and assumes a refractive index of 1.52. The positive lens elements 156 have a focal length of 460 $\mu$m. The liquid crystal panel 153 and the lens array plate 152 are bonded at their edge portions by an adhesive material to form a thin air layer therebetween.

Figure 12:
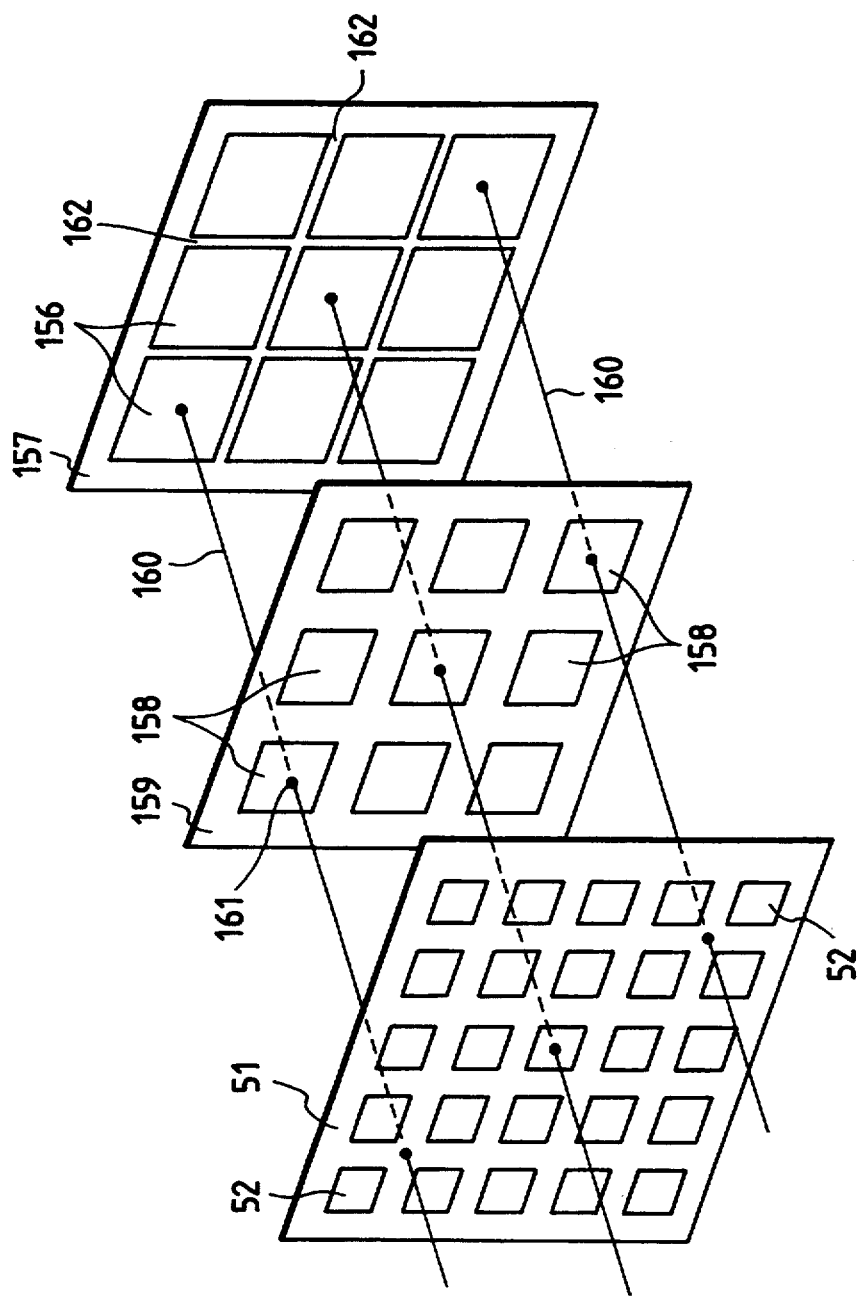
FIG. 12 is a perspective view which shows arrangement of elements of the liquid-crystal light valve unit, as shown in FIG. 11.

FIG. 12 shows the arrangement of the lens array 157, the light-reflecting film 159, and the black matrix 51. The elements of these, as clear from the drawing, are all oriented in a square matrix arrangement. A pitch between the centers of the adjacent positive lend elements 156 of the lens array 157 is equal to that between the centers of adjacent openings 158 of the light-reflecting film 159, but it is much greater than that between the centers of the adjacent pixels 52 of the black matrix 51. An optical axis 160 of each of the positive lens elements 156 of the lens array 157 is oriented to extend through the center 161 of each of the openings 158 of the light-reflecting film 159. The positive lens elements 156 of the lens array 157 have a rectangular effective area, and are arranged at horizontal pitches of 180 $\mu$m and vertical pitches of 122 $\mu$m. Between the adjacent lens elements 156, non-lens portions 162 having a width of 5 $\mu$m are defined. Each of the openings 158 of the light-reflecting film 159 is of a rectangle defined by a 81 $\mu$m horizontal side and a 61 $\mu$m vertical side.

The arrangement above also provides the same effects as achieved by the above first embodiment. Moiré may occur as a result of interference between periodic structures of the openings 158 of the light-reflecting film 159 and the pixels 52 of the liquid crystal panel 153. It is possible however, to minimize Moiré by increasing an interval between the lens array plate 152 and the light-receiving side glass substrate 47 of the liquid crystal panel 153.

The positive lens elements 156 of the lens array 157 and the openings 158 of the light-reflecting film 159 are, as already mentioned, arranged at pitches much greater than pixel pitches of the liquid crystal panel 153. In addition, the number of the positive lens elements 156 of the lens array 157 and the number of the openings 158 of the light-reflecting film 159 are both less than that of the pixels 52 of the liquid crystal panel 153. Therefore, the liquid-crystal light valve unit of this embodiment may be manufactured in a relatively simple manner and at economic cost levels.

Figure 13:
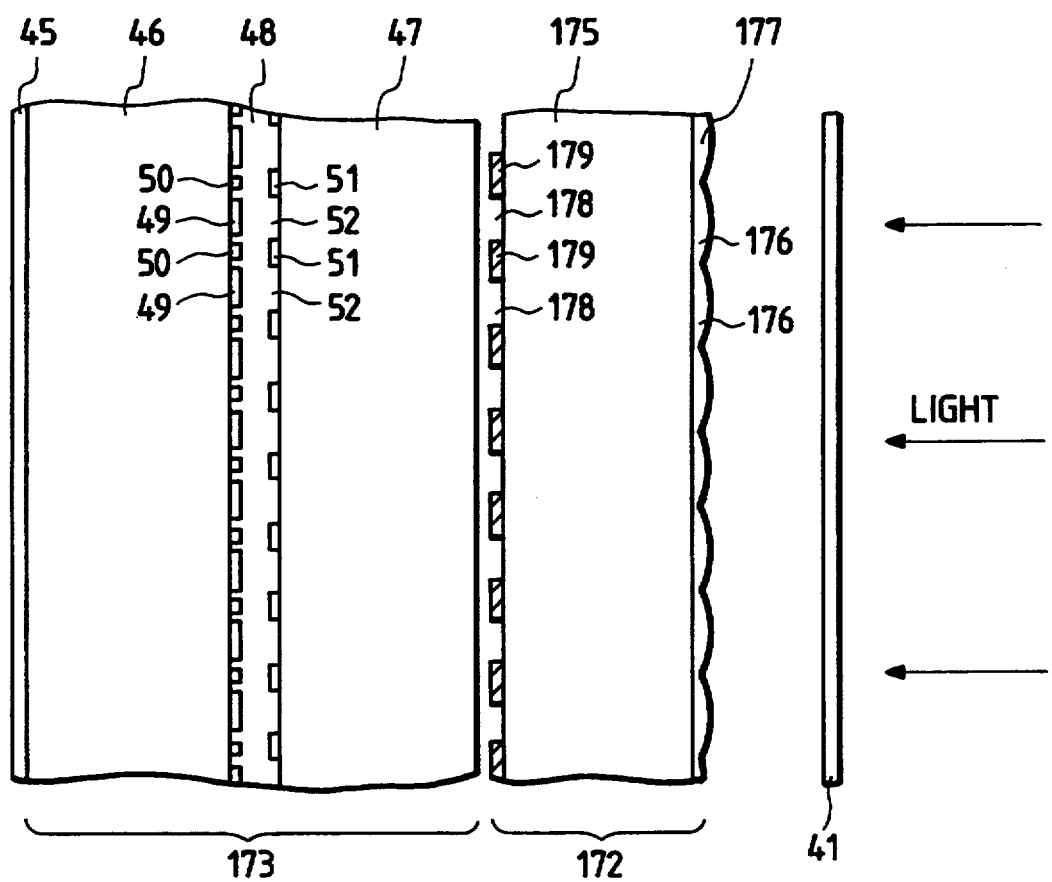
FIG. 13 is an enlarged cross-sectional view which shows essential part of a liquid-crystal light valve unit according to a fourth embodiment of the invention.

Referring to FIG. 13, there is shown a liquid-crystal light valve unit of a fourth embodiment according to the invention. The liquid-crystal light valve unit of this embodiment includes a light-receiving side polarizing plate 41, a lens array plate 172, a liquid crystal panel 173, and a light-projecting side polarizing plate 45. This arrangement is different from the one, as shown in FIGS. 11 and 12 only in arrangement of lens elements of the lens array plate 172 and dimensions thereof.

The liquid crystal panel 173, similar to the one shown in FIG. 5, includes two glass substrates 46 and 47 and a TN liquid crystal sandwich therebetween to form a liquid crystal layer 48. On a 5 surface of the glass substrate 47 facing the liquid crystal layer 48, a black matrix 51 is formed. The lens array plate 172 is substantially the same as the one shown in FIGS. 9 and 10, with a difference in size, and includes a glass substrate 175 on a light-receiving surface of which an array 177 of positive lens elements 176 are provided. On a surface of the glass substrate 175 facing with the liquid crystal panel 173, a light-reflecting film 179 is formed which includes a plurality of openings 178. The glass substrate 175 has a thickness of 0.7 mm and assumes a refractive index of 1.52. The positive lens elements 176 have a focal length of 460 μm. The liquid crystal panel 173 and the lens array plate 172 are bonded at their edge portions by an adhesive material to define a thin air gap therebetween.

Figure 14:
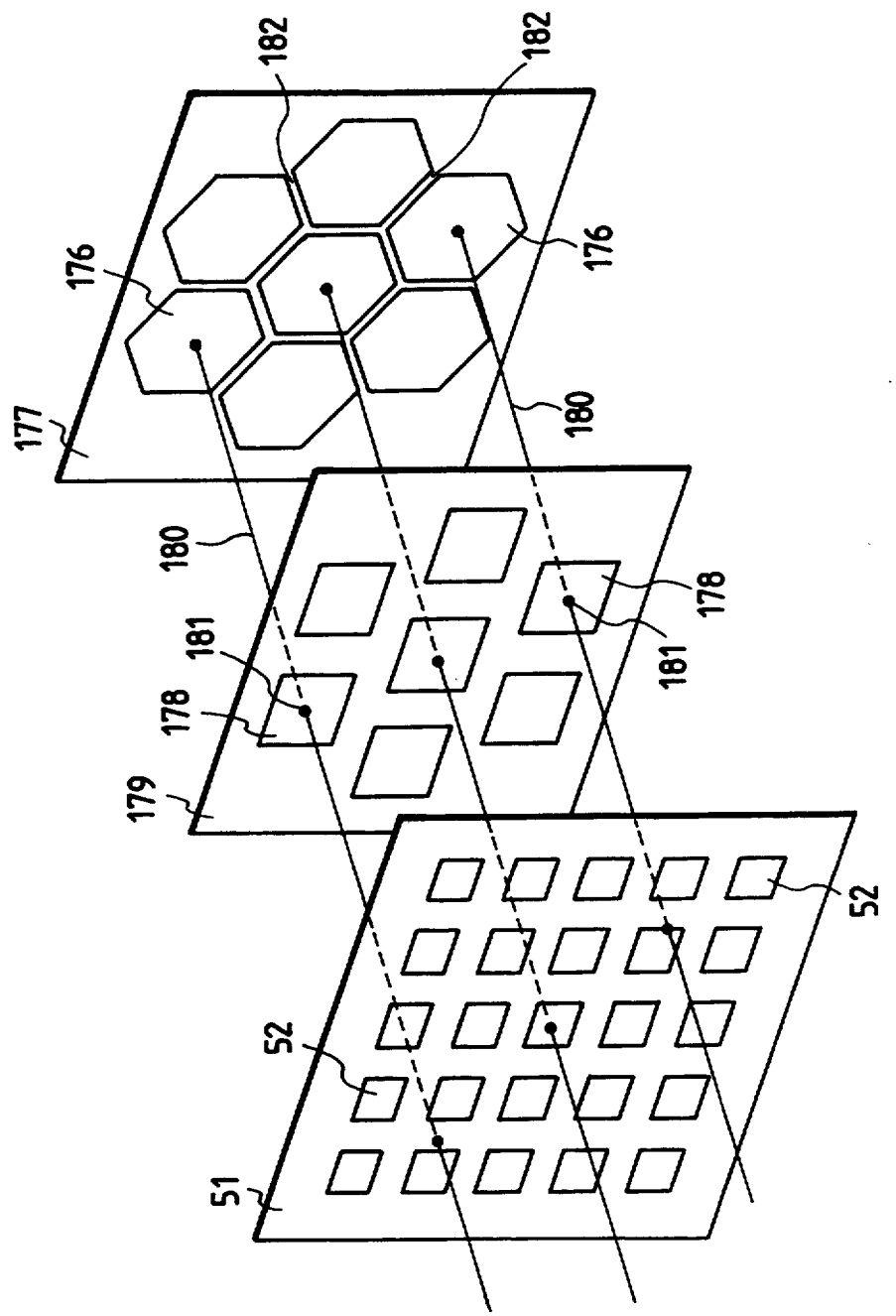
FIG. 14 is a perspective view which shows arrangement of elements of the liquid-crystal light valve unit, as shown in FIG. 13.

FIG. 14 shows the arrangement of the lens array 177, the light-reflecting film 179, and the black matrix 51. As can be seen in the drawing, the positive lens elements 176 of the lens array 177 and the openings 178 of the light-reflecting film 179 are oriented in the delta arrangement, while pixels 52 of the black matrix 51 are oriented in the square matrix arrangement. Horizontal and vertical pitches between the centers of the adjacent positive lens elements 176 of the lens array 177 are equal to those between the centers of adjacent openings 178 of the light-reflecting film 179, and they are much greater than those between the centers of the adjacent pixels 52 of the black matrix 51. The horizontal pitch is 354 μm, while the vertical pitch is 306 μm. An optical axis 180 of each of the positive lens elements 176 of the lens array 177 is oriented to extend through the center 181 of each of the openings 178 of the light-reflecting film 179. The positive lens elements 176 of the lens array 177 have a hexagonal effective area. Defined between the adjacent lens elements 176 are non-lens portions 182 each having a width of 5 μm. Each of the openings 178 of the light-reflecting film 179 has a rectangular area defined by a 43 μm horizontal side and a 50 μm vertical side. The black matrix 51 arranges pixels at horizontal pitches of 94 μm and vertical pitches of 73 μm.

The arrangement above is different from the first embodiment in the arrangement of the lens elements of the lens array plate 172, however, provides the same effects as achieved by the first embodiment. In addition, the number of the positive lens elements 176 of the lens array 177 and the number of the openings 178 of the light-reflecting film 179 are, similar to the third embodiment, increased greatly, and the same lens array plate 172 may be employed regardless of the arrangement of the pixels of the liquid crystal panel 173. It will be noted that the liquid-crystal light valve unit of this embodiment may be manufactured at economic cost levels.

Figure 15:
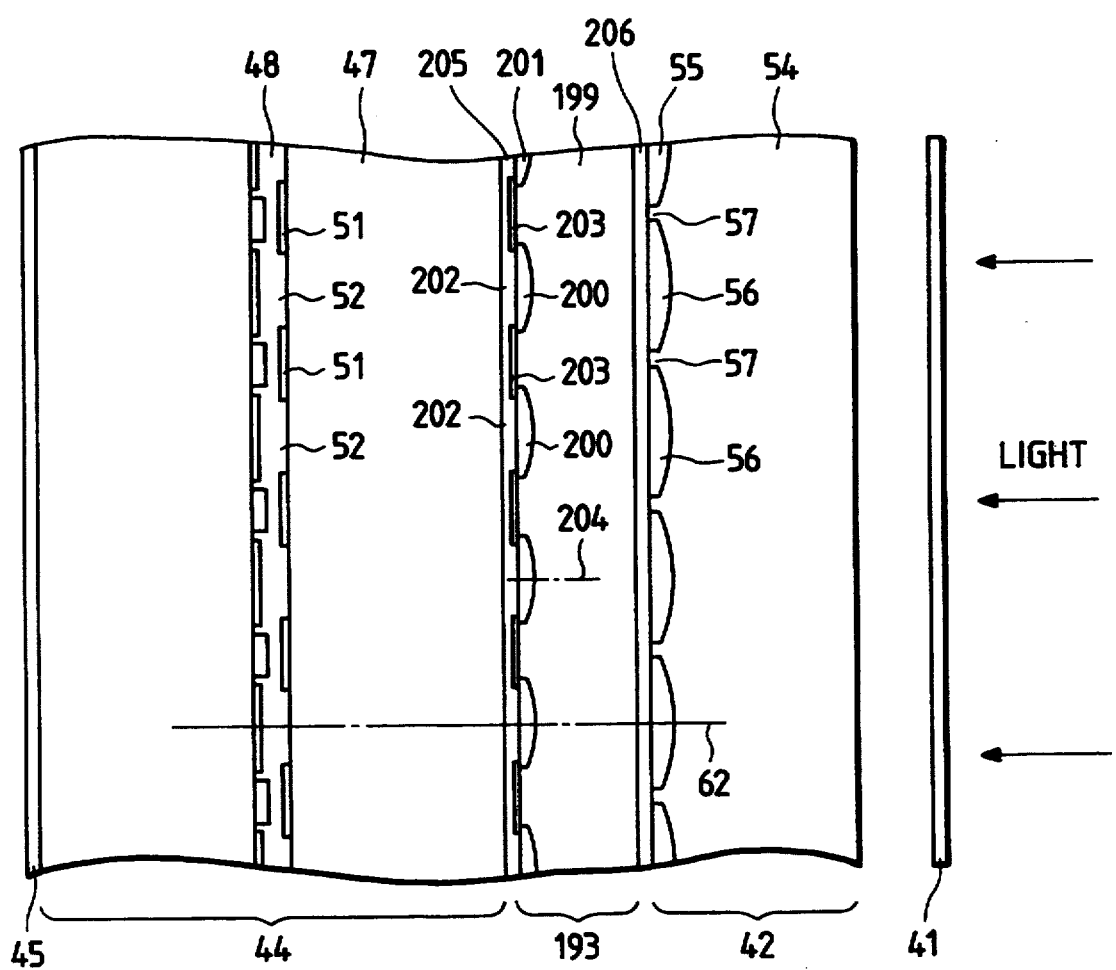
FIG. 15 is an enlarged cross-sectional view which shows essential part of a liquid-crystal light valve unit according to a fifth embodiment of the invention.

Referring to FIG. 15, a liquid-crystal light valve unit of a fifth embodiment is shown. This liquid-crystal light valve unit includes a light-receiving side polarizing plate 41, a lens array plate 42, a mirror plate 193, a liquid crystal panel 44, and a light-projecting side polarizing plate 45. This arrangement is different from the FIG. 5 arrangement only in that the mirror plate 193 has a lens array, as will be described hereinafter in detail.

The mirror plate 193 includes a glass substrate 199 which forms in its light-projecting side surface a lens array 201 of positive lens elements 200. On the lens array 201, a light-reflecting film 203 is formed which includes a plurality of openings 202 each coinciding with one of the lens elements 200. The mirror plate 193 has a thickness of 0.4 mm in the glass substrate and assumes a refractive index of 1.52. Each of the positive lens elements 200 has a focal length of about 270 μm and an effective area slightly greater than that of each of the openings 202. An optical axis 204 of each of the positive lens elements 200 extends through the center of each of the openings 202 in alignment with an optical axis 62 of each positive lens element 56 of the lens array plate 42.

The mirror plate 193 is attached to a light-receiving side glass substrate 47 of the liquid crystal panel 44 by means of a transparent adhesive material 205. The lens array plate 42 is secured to the mirror plate 193 using a transparent adhesive material 206. The light-receiving side polarizing plate 41 is arranged away from the lens array plate 42, while the light-projecting side polarizing plate 45 is attached directly to the liquid crystal panel 44.

In operation, when light enters the liquid crystal panel 44, part of the light passes through the openings 52 toward the liquid crystal layer 48, while the remainder thereof reaches the black matrix 51 which is, in turn, reflected thereby toward the mirror plate 193 so that it is directed to the liquid crystal layer 48 again. It will be noted that the effective aperture ratio of the liquid-crystal light valve unit is greater than the aperture ratio of the black matrix 51. In addition, each of the positive lens elements 200 of the lens array 201 orients a principal ray incident to the periphery of each of the openings 202 parallel to the optical axis 62 and thus, a spreading angle of the light projected from the liquid-crystal light valve unit becomes smaller than that in the liquid-crystal light valve unit, as shown in FIG. 5.

In an arrangement using a conventional lens array, increasing an effective aperture ratio of a liquid crystal panel on which pixels are arranged at smaller pitches requires provision of a thin light-receiving side glass substrate. The liquid-crystal light valve unit of this embodiment, however, eliminates the need for such a thin light-receiving side glass substrate, and thus, uniformity of width of the liquid crystal layer 48 is obtained. This makes it possible to display high-quality bright images on the liquid crystal panel 44.

Additionally, it is possible to make flat the surfaces of two types of lens arrays 55 and 201 each forming distributed index lenses. Therefore, even when the lens array plate 42, the mirror plate 193, and the liquid crystal panel 33 are bonded using a transparent adhesive material, desired lens effects are faithfully established. A reflection loss produced on an interface where there is the difference in refractive index, is reduced greatly. Further, a combination of the lens array plate 42 and the mirror plate 193 advantageously provides high mechanical strength even when either of them is very thin.

The liquid-crystal light valve unit, as shown in FIG. 15, may be employed in the projection display system, as shown in FIG. 7. In this case, even when an aperture ratio of the projection lens system 77 is changed from F3.0 to F3.5 to cause the brightness the projection lens system provides to be reduced, substantially the same brightness of projected images may be obtained. This means that the lens array 201 is very effective to increase the brightness of the images projected.

Figure 16:
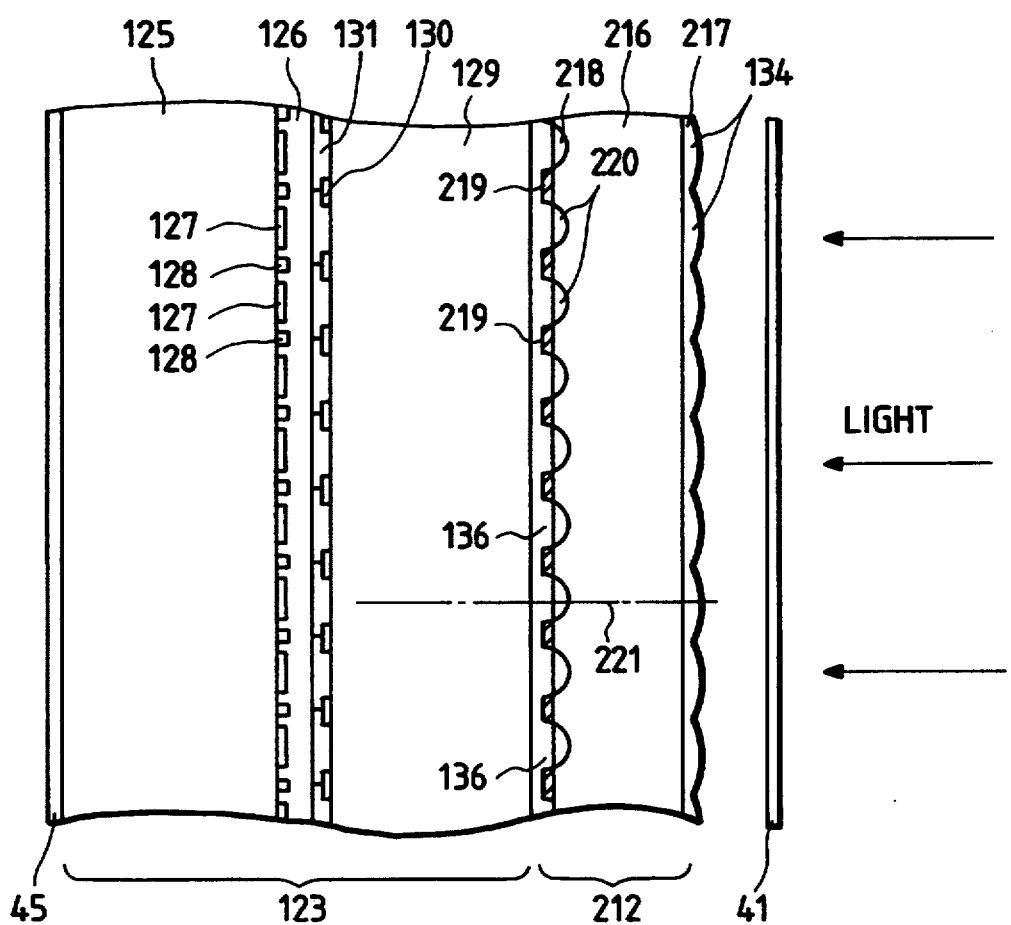
FIG. 16 is an enlarged cross-sectional view which shows essential part of a liquid-crystal light valve unit according to a sixth embodiment of the invention.

Referring to FIG. 16, there is shown a liquid-crystal light valve unit of a sixth embodiment. This liquid-crystal light valve unit includes a light-receiving side polarizing plate 41, a lens array plate 212, a liquid crystal panel 123, and a light-projecting side polarizing plate 45. This arrangement is different from the one, as shown in FIG. 9 only in that the lens array plate 212 forms an additional lens array, as discussed below, in a surface facing the liquid crystal panel 123.

The lens array plate 2 12 includes a first lens array 217 on a surface of a glass substrate 2 16 facing with the polarizing plate 41, a second lens array 218 in a surface facing with the liquid crystal panel 123, and a light-reflecting film 219 having a plurality of openings 136 on the second lens array 218. The first lens array 217 and the light-reflecting film 219 have the same constructions as the lens array 135 and the light-reflecting film 137, as shown in FIG. 9, respectively. The second lens array includes distributed index positive lens elements 220 which are formed in the delta arrangement in the surface of the glass substrate 216 using an ion exchange process. Each of the positive lens elements 220 has a focal length of about 340 μm substantially equal to that of the positive lens elements 134 of the first lens array 217. The openings 136 of the light-reflecting film 219 are oriented in the delta arrangement. An optical axis 221 of each of the positive lens elements 220 of the second lens array 218 is oriented to extend through the center of each of the openings 136 in alignment with an optical axis of each positive lens element 134 of the first lens array 217. The positive lens elements 220 have an effective area slightly greater than that of the openings 136.

The thus-constructed arrangement, similar to the above embodiment, greatly improves the effective aperture ratio in combination with the first lens array 217, the second lens array 218, and the light-reflecting film 219 so that the light-utilization efficiency is improved, thus enabling bright images to be projected. Further, a spreading angle of light emerging from the liquid-crystal light valve unit is decreased as compared with that in the one shown in FIG. 9. In addition, it is possible to employ the liquid-crystal light valve unit of this embodiment in the projection display system, as shown in FIG. 7, to form a full color image.

Figure 17:
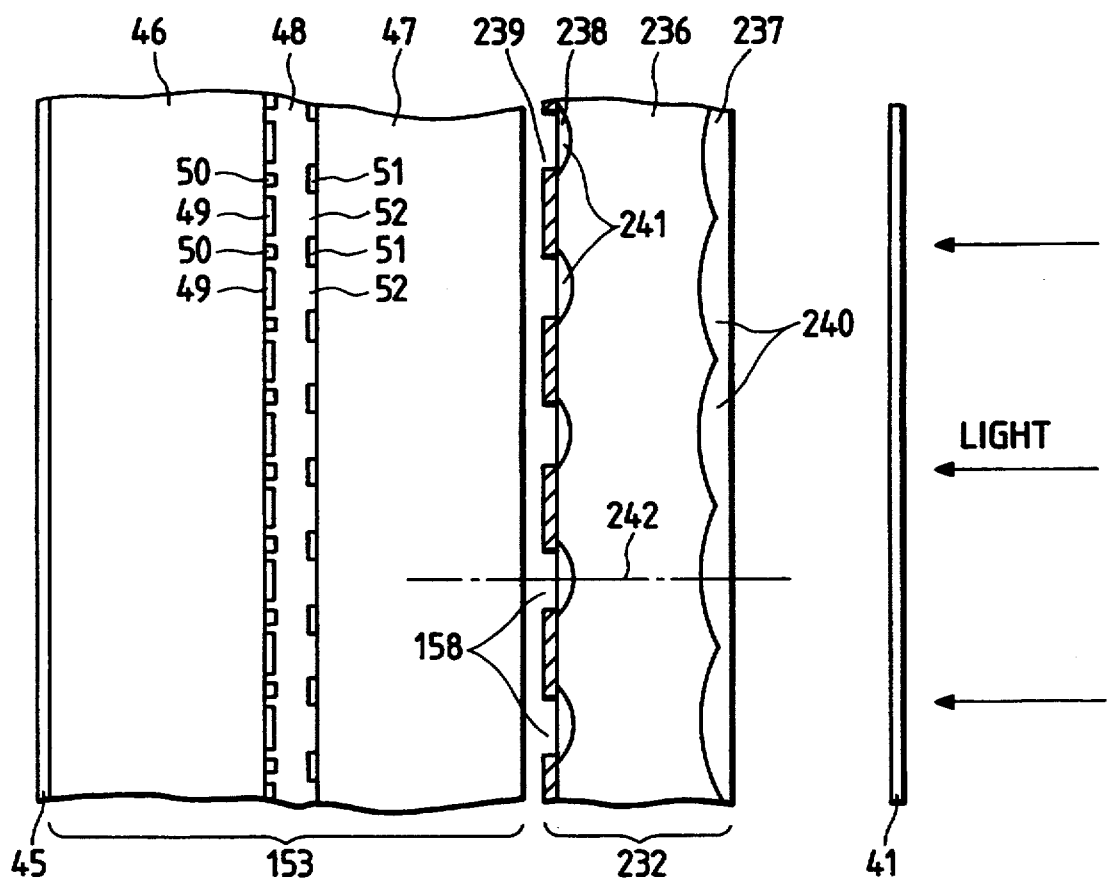
FIG. 17 is an enlarged cross-sectional view which shows essential part of a liquid-crystal light valve unit according to a seventh embodiment of the invention.

Referring to FIG. 17, there is shown a liquid-crystal light valve unit of a seventh embodiment. This liquid-crystal light valve unit includes a light-receiving side polarizing plate 41, a lens array plate 232, a liquid crystal panel 153, and a light-projecting side polarizing plate 45. This arrangement is different from the one, as shown in FIG. 11 only in the lens array plate 232.

The lens array plate 232 includes a first lens array 237 in a surface of a glass substrate 236 facing with the polarizing plate 41, a second lens array 238 in a surface facing with the liquid crystal panel 153, and a light-reflecting film 239 having a plurality of openings 158 on the second lens array 238. The first and second lens arrays 237 and 238 include distributed index positive lens elements 240 and 241 which are formed in the glass substrate 236 using an ion exchange process. Each of the positive lens elements 240 and 241 has a focal length of about 460 μm. An optical axis 242 of each of the positive lens elements 240 of the first lens array 237 extends through the center of each of the openings 158 of the light-reflecting film 239 in alignment with an optical axis of each of the positive lens element 241 of the second lens array 238. The positive lens elements 241 have an effective area slightly greater than that of the openings 158.

While the lens array plate 232 arranges the lens elements at different pitches from those of pixels of the liquid crystal panel 153, the light valve of this embodiment may provides the same effects as achieved by the fifth embodiment, as explained above, and does not produce unwanted Moiré.

Additionally, the first and second lens arrays 237 and 238 have the same focal length and carries the positive lens elements at the same pitch. An effective area of each of the positive lens elements 241 of the second lens array 238 depends upon the light-reflecting film 239. Thus, the first and second lens arrays 237 and 238 may be formed at the same time using the ion exchange process, manufacturing costs thereby being reduced. The formation of the same lens array in both sides of the glass substrate 236 minimizes deformation of the lens array plate 232 such as bending.

Figure 18:
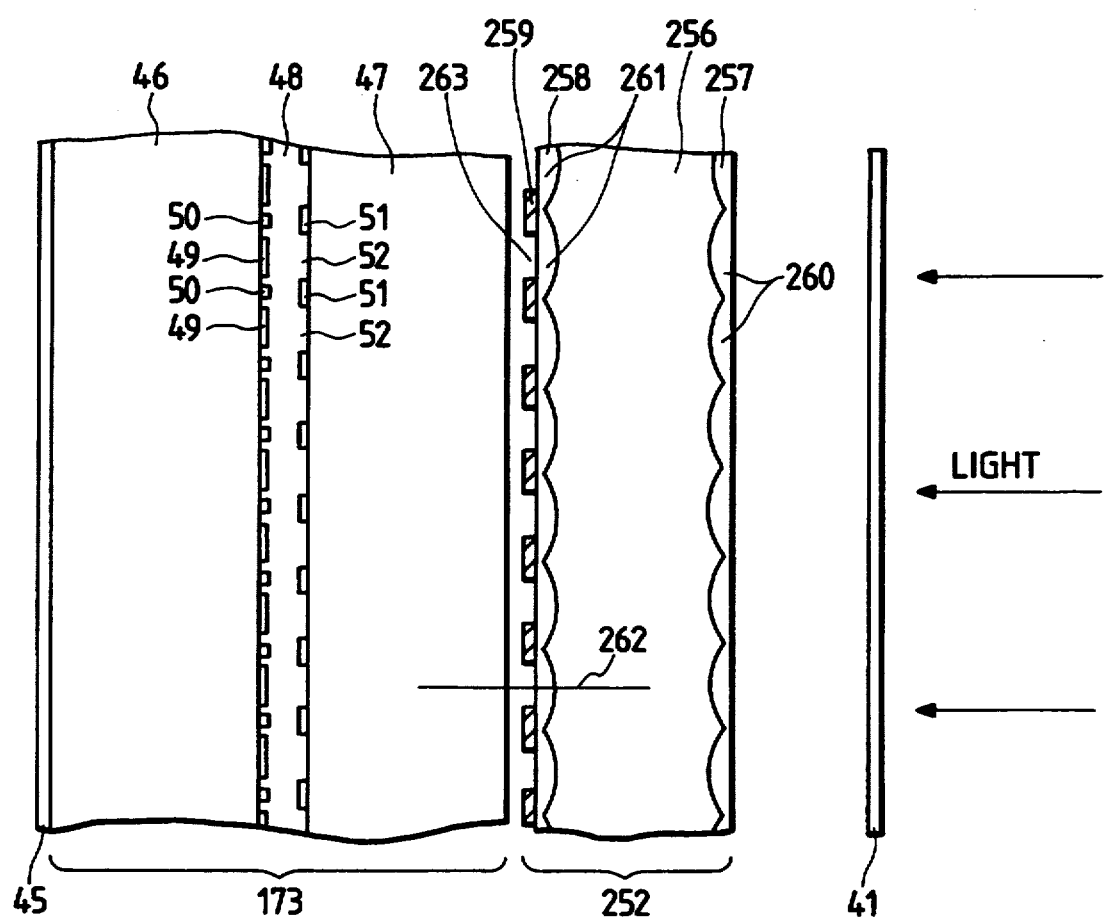
FIG. 18 is an enlarged cross-sectional view which shows essential part of a liquid-crystal light valve unit according to an eighth embodiment of the invention.

Referring to FIG. 18, there is shown a liquid-crystal light valve unit of an eighth embodiment. This liquid-crystal light valve unit includes a light-receiving side polarizing plate 41, a lens array plate 252, a liquid crystal panel 173, and a light-projecting side polarizing plate 45. This arrangement is different from the one, as shown in FIG. 13 only in the lens array plate 252.

The lens array plate 252 includes a first lens array 257 in a surface of a glass substrate 256 facing with the polarizing plate 41, a second lens array 258 in a surface facing with the liquid crystal panel 173, and a light-reflecting film 259 having a plurality of openings 263 on the second lens array 258. The first and second lens arrays 257 and 258 include positive lens elements 260 and 261 which are respectively oriented in the delta arrangement at pitches equal to those of the lens array 172, as shown in FIG. 13. Each of the positive lens elements 260 and 261 has a focal length of about 460 μm. An optical axis 242 of each of the positive lens elements 261 of the second lens array 258 extends through the center of each of the openings 263 of the light-reflecting film 259 in alignment with an optical axis of each of the positive lens elements 260 of the first lens array 257. Both the positive lens elements 261 of the second lens array 258 have an effective area greater than that of the openings 263.

This embodiment provides the same effects as achieved by the fifth embodiment. In addition, the arrangement of the lens elements of the lens array plate 252, similar to the fourth embodiment, does not depend upon the arrangement of pixels of the liquid crystal panel 173, thus enabling manufacturing costs of the lens array plate 252 to be decreased greatly.

A modification of the liquid-crystal light valve unit will be explained below.

The lens array and the light-reflecting film, as discussed above, which are essential to the light valve of the invention, require supporting members, respectively. For example, in the liquid-crystal light valve unit according to the first model, as previously mentioned, the light-reflecting film may be attached to the light-receiving side surface of the glass substrate of the liquid crystal panel. In addition, in the liquid-crystal light valve unit according to the second model, the light-reflecting film may be secured on the light-receiving side surface of the glass substrate of the liquid crystal panel, the second lens array of the lens array may be formed in the light-reflecting film on the liquid crystal panel, while the first lens array is formed in or on the light-receiving side surface of the glass substrate of the lens array plate.

Additionally, in the liquid-crystal light valve unit according to the first model, the pitches of the positive lens elements of the lens array may be set slightly greater than the pitches of the openings of the light-reflecting film. Additionally, in the liquid-crystal light valve unit according to the second model, the pitches of the positive lens elements of the first lens array may be set slightly greater than the pitches of the openings of the light-reflecting film, and the optical axis of each of the positive lens elements of the second lens array may be aligned only with the center of each of the openings of the light-reflecting film. Further, when the openings of the light-reflecting film are so arranged as to orient principal rays passing through the pixels around the periphery of the liquid crystal panel inwardly, it will cause the micro light sources formed in the openings of the light-reflecting film to enter the openings of the liquid crystal panel with high efficiency. This arrangement thus, eliminates the need for the auxiliary lens 79, as shown in FIG. 7.

Generally, a liquid crystal panel using a TN liquid crystal assumes a high contrast ratio in a direction slightly tilted from the normal line of a liquid crystal layer. It is thus, desirable that light be directed to a liquid crystal panel at a given angle for projecting images at a high contrast ratio. In this case, in the liquid-crystal light valve unit according to the first model, the openings of the light-reflecting film should preferably be shifted parallel to the positive lens elements of the lens array so that a real image of the micro light source formed on each focal point of the lens array may be developed in each of the openings of the light-reflecting film. Additionally, in the liquid-crystal light valve unit according to the second model, the openings of the light-reflecting film and the positive lens elements of the second lens array should desirably be shifted slightly in a parallel direction to the positive lens elements of the first lens array so that a real image of the micro light source formed on each focal point of the first lens array may appear in each of the openings of the light-reflecting film. In either case, a light beam projected from the micro light source formed on the focal point of each of the positive lens elements of the lens array reaches each pixel of the liquid crystal panel with high efficiency.

The lens array may be made in various processes such as forming distributed index lenses on a surface of a glass substrate by a preferential diffusion process or lapping a surface of a glass substrate with a thermoplastic resin which is, in turn, subjected to heat. In addition, the above embodiments teach use of aluminum for forming the light-reflecting film and the black matrix, however, high-reflectivity metals such as silver and chrome may be used to form a reflecting surface.

Further, the above embodiments teach the utilization of the TFT liquid crystal panel as a light valve. It should be noted however, that the present invention is not limited to same and that the light valve may be provided with other similar types of liquid crystal panels or using an electro-optic crystal as long as they form an optical image as a result of change in optical characteristics.

Figure 19:
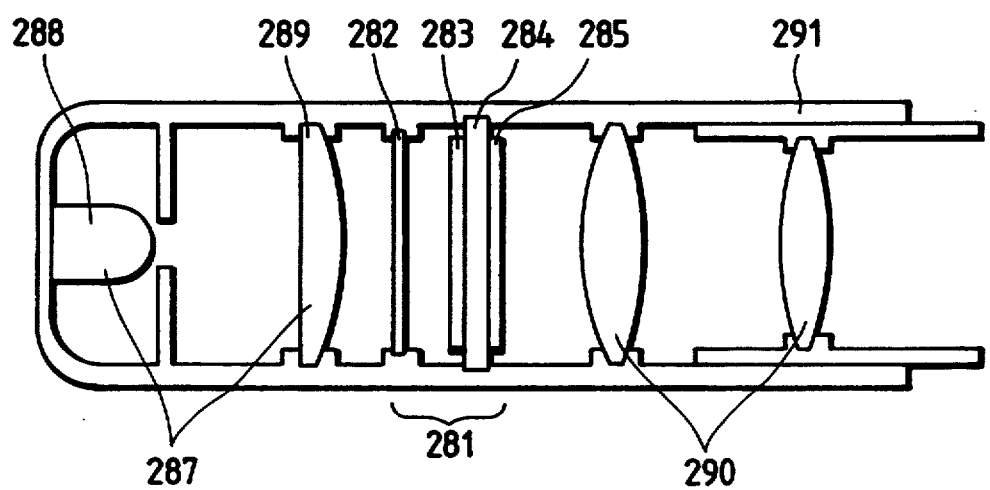
FIG. 19 is a cross-sectional view which shows a view finder apparatus incorporating a liquid-crystal light valve unit according to the present invention.

FIG. 19 shows a view finder apparatus employing a liquid-crystal light valve unit.

The view finder apparatus includes a casing 291, eyepieces 290, a liquid-crystal light valve unit 281, and a light source unit 287.

The liquid-crystal light valve unit 281 is similar to the one, as shown in FIG. 16, with a difference in size, and includes a light-receiving side polarizing plate 282, a lens array plate 283, a liquid crystal panel 284, and a light-projecting side polarizing plate 285. The liquid-crystal light valve unit 281 may alternatively be provided with any of the light valves, as taught previously. The liquid crystal panel 284 is provided with a TFT liquid crystal panel using a TN liquid crystal, and includes therein a tessellated color filter. The liquid crystal panel 284 has a display dimension of 0.7 in. and is designed to display a full color image. Pixels are constructed of a matrix of 372 horizontal elements at pitches of 38 $\mu$m and 238 vertical elements at pitches of 44 $\mu$m. Each of the pixel is defined by a horizontal side of 18 $\mu$m and a vertical side of 24 $\mu$m. An aperture ratio is 25%. Two glass substrate making up the liquid crystal panel 284 have a thickness of 1.1 mm and assume a refractive index of 1.52, respectively. The positive lens elements of the first and second lens arrays have a focal length of 200 $\mu$m.

The light source unit 287 includes a lamp 288 and a condenser lens 289. The lamp 288 is formed with a 7 mm diameter×20 mm length fluorescent lamp, however, it may alternatively be provided with a high-intensity small lighting such as an LED, a tungsten halogen lamp, or a cathode-ray tube. Light radiated from the lamp 288 is converted by the condenser lens 289 into a light beam having a narrow directivity so that it enters the liquid-crystal light valve unit 281. The light projected from the liquid-crystal light valve unit 281 travels toward the eyepieces 290 so that a viewer can observe a magnified virtual image on the liquid-crystal light valve unit 281.

The thus-constructed view finder apparatus assumes a high effective aperture ratio of the liquid-crystal light valve unit because of the activity of the lens array plate, resulting in greatly improved efficiency of utilization of light. This makes it possible to reduce a power consumption of the light source unit 287. A continuous operating lifetime produced by one-time battery charging thus, becomes longer than that produced by an arrangement without the lens array.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A light valve apparatus comprising:
   a light valve having openings defining pixels in a matrix arrangement;
   first light-reflecting means for reflecting light projected from a light source entering out of the openings of said light valve;
   second light-reflecting means, including openings in a matrix arrangement, located between the light source and said first light-reflecting means, for directing the light reflected from said first light-reflecting means toward said light valve while allowing the light from the light source to be propagated through the openings to said light valve; and a lens array including a plurality of positive lens elements in a matrix arrangement for directing the light from the light source to said second light-reflecting means, a focal point of each of the positive lens elements being defined on a given area in the vicinity of each of the openings of said second light-reflecting means.

2. A light valve apparatus as set forth in claim 1, wherein said second light-reflecting means is formed on a light-projecting surface of a first transparent plate arranged on a light-receiving side of said light valve, said lens array being formed on a light-receiving surface of a second transparent plate arranged on a light-receiving side of the first transparent plate or adjacent the light-receiving surface thereof.

3. A light valve apparatus as set forth in claim 1, wherein said second light-reflecting means is formed on a light-projecting surface of a transparent plate arranged on a light-receiving side of said light valve, said lens array being formed on a light-receiving suffice of the transparent plate or adjacent the light-receiving surface thereof.

4. A light valve apparatus as set forth in claim 1, wherein an optical axis of each of the positive lens elements is oriented to extend through a central portion of each of the openings of said second light-reflecting means.

5. A light valve apparatus as set forth in claim 1, wherein said lens array includes the positive lens elements in a delta arrangement.

6. A light valve apparatus as set forth in claim 5, wherein each of the positive lens elements has a regular hexagonal effective area.

7. A light valve apparatus as set forth in claim 5, wherein the positive lens elements are so arranged that a line extending through centers of the three adjacent positive lens elements defines an equilateral triangle.

8. A light valve apparatus as set forth in claim 1, wherein said first light-reflecting means is made of an aluminum material.

9. A light valve apparatus as set forth in claim 1, wherein said second light-reflecting means is made of an aluminum material.

10. A light valve apparatus as set forth in claim 1, wherein said first light-reflecting means defines the openings of said light valve.

11. A light valve apparatus as set forth in claim 1, wherein said first light-reflecting means includes a light-reflecting surface, said second light-reflecting means including a light-reflecting surface which is arranged parallel to the light-reflecting surface of said first light-reflecting means.

12. A projection display apparatus comprising:
a light source;
a light valve unit responsive to light from said light source to form an optical image according to an image signal; and
a projection lens operable to project the optical image on a projection screen,
said light valve unit including,
a light valve having openings defining pixels in a matrix arrangement,
first light-reflecting means for reflecting light projected from said light source entering out of the openings of said light valve,
second light-reflecting means, including openings in a matrix arrangement, located between said light source and said first light-reflecting means, for directing the light reflected from said first light-reflecting means toward said light valve while allowing the light from the said light source to be propagated through the openings to said light valve, and
a lens array including a plurality of positive lens elements in a matrix arrangement for directing the light from said light source to said second light-reflecting means, a focal point of each of the positive lens elements being defined on a given area in the vicinity of each of the openings of said second light-reflecting means.

13. A view finder apparatus
a light source;
a light valve unit responsive to light from said light source to form an optical image according to an image signal; and
an magnifying lens for magnifying the optical image, said light valve unit including,
a light valve having openings defining pixels in a matrix arrangement,
first light-reflecting means for reflecting light projected from said light source entering out of the openings of said light valve,
second light-reflecting means, including openings in a matrix arrangement, located between said light source and said first light-reflecting means, for directing the light reflected from said first light-reflecting means toward said light valve while allowing the light from the said light source to be propagated through the openings to said light valve, and
a lens array including a plurality of positive lens elements in a matrix arrangement for directing the light from said light source to said second light-reflecting means, a focal point of each of the positive lens elements being defined on a given area in the vicinity of each of the openings of said second light-reflecting means.

14. A view finder apparatus as set forth in claim 13, wherein said light source includes a lighting means and a condenser lens, said condenser lens being designed to convert light from said lighting means into a light beam having a narrower directivity.

15. A light valve apparatus comprising:
a light valve having openings defining pixels in a matrix arrangement;
first light-reflecting means for reflecting light projected from a light source entering out of the openings of said light valve;
second light-reflecting means, including openings in a matrix arrangement, located between the light source and said first light-reflecting means, for directing the light reflected from said first light-reflecting means toward said light valve while allowing the light from the light source to be propagated through the openings to said light valve;
a first lens array of positive lens elements arranged in a matrix arrangement on a light-receiving side of said second light-reflecting means, each of the positive lens elements being in alignment with each of the openings of said second light-reflecting means, a focal point of each of the positive lens elements being defined on a given area in the vicinity of each of the openings of said second light-reflecting means; and
a second lens array of positive lens elements each being provided adjacent each of the openings of said second light-reflecting means, a focal point of each of the positive lens elements being defined in the vicinity of a principal point of each of the positive lens elements of said first lens array.

16. A light valve apparatus as set forth in claim 15, wherein a focal length of each of the positive lens elements of said second lens array is substantially the same as that of each of the positive lens elements of said first lens array.

17. A light valve apparatus as set forth in claim 15, wherein said second lens array is formed on in a light-projecting surface of a first transparent plate arranged on a light-receiving side of said light valve or adjacent the light-projecting surface thereof, said second light-reflecting means being formed on the light-projecting surface of the first transparent plate, said first lens array being formed on a light-projecting surface of a second transparent plate located on a light-receiving side of the first transparent plate or adjacent the light-projecting surface of the second transparent plate.

18. A light valve apparatus as set forth in claim 15, wherein said second lens array is formed on in a light-projecting surface of a transparent plate arranged on a light-receiving side of said light valve or adjacent the light-projecting surface thereof, said second light-reflecting means being formed on the light-projecting surface of the transparent plate, said first lens array being formed on a light-receiving surface of the transparent plate or adjacent the light-receiving surface of the transparent plate.

19. A light valve apparatus as set forth in claim 15, wherein an optical axis of each of the positive lens elements of said first lens array is oriented to extend through a central portion of each of the openings of said second light-reflecting means.

20. A light valve apparatus as set forth in claim 15, wherein an optical axis of each of the positive lens elements of said second lens array is oriented to extend through a central portion of each of the openings of said second light-reflecting means.

21. A light valve apparatus as set forth in claim 15, wherein the positive lens elements of said first lens array is in a delta arrangement.

22. A light valve apparatus as set forth in claim 21, wherein each of the positive lens elements of said first lens array has a regular hexagonal effective area.

23. A light valve apparatus as set forth in claim 21, wherein the positive lens elements of said first lens array are so arranged that a line extending through centers of the three adjacent positive lens elements defines an equilateral triangle.

24. A light valve apparatus as set forth in claim 15, wherein said first light-reflecting means is made of an aluminum material.

25. A light valve apparatus as set forth in claim 15, wherein said second light-reflecting means is made of an aluminum material.

26. A light valve apparatus as set forth in claim 15, wherein said first light-reflecting means defines the openings of said light valve.

27. A light valve apparatus as set forth in claim 15, wherein said first light-reflecting means includes a light-reflecting surface, said second light-reflecting means including a light-reflecting surface which is arranged parallel to the light-reflecting surface of said first light-reflecting means.

28. A light valve apparatus as set forth in claim 15, wherein a configuration of an effective area of each of the positive lens elements of said second lens array is substantially the same as that of each of the openings of said second light-reflecting means.

29. A projection display apparatus comprising:
a light source;
a light valve unit responsive to light from said light source to form an optical image according to an image signal; and
a projection lens operable to project the optical image on a projection screen,
said light valve unit including,
a light valve having openings defining pixels in a matrix arrangement,
first light-reflecting means for reflecting light projected from said light source entering out of the openings of said light valve,
second light-reflecting means, including openings in a matrix arrangement, located between said light source and said first light-reflecting means, for directing the light reflected from said first light-reflecting means toward said light valve while allowing the light from said light source to be propagated through the openings to said light valve,
a first lens array of positive lens elements arranged in a matrix arrangement on a light-receiving side of said second light-reflecting means, each of the positive lens elements being in alignment with each of the openings of said second light-reflecting means, a focal point of each of the positive lens elements being defined on a given area in the vicinity of each of the openings of said second light-reflecting means, and
a second lens array of positive lens elements each being provided adjacent each of the openings of said second light-reflecting means, a focal point of each of the positive lens elements being defined in the vicinity of a principal point of each of the positive lens elements of said first lens array.

30. A projection display apparatus as set forth in claim 29, wherein each of the positive lens element of said second lens array is designed for forming an imaginary object located adjacent each of the positive lens elements of said first lens array on a pupil surface of said projection lens on a side of said light valve.

31. A view finder apparatus
a light source;
a light valve unit responsive to light from said light source to form an optical image according to an image signal; and
an magnifying lens for magnifying the optical image,
said light valve unit including,
a light valve having openings defining pixels in a matrix arrangement,
first light-reflecting means for reflecting light projected from said light source entering out of the openings of said light valve,
second light-reflecting means, including openings in a matrix arrangement, located between said light source and said first light-reflecting means, for directing the light reflected from said first light-reflecting means toward said light valve while allowing the light from said light source to be propagated through the openings to said light valve,
a first lens array of positive lens elements arranged in a matrix arrangement on a light-receiving side of said second light-reflecting means, each of the positive lens elements being in alignment with each of the openings of said second light-reflecting means, a focal point of each of the positive lens elements being defined on a given area in the vicinity of each of the openings of said second light-reflecting means, and a second lens array of positive lens elements each being provided adjacent each of the openings of said second light-reflecting means, a focal point of each of the positive lens elements being defined in the vicinity of a principal point of each of the positive lens elements of said first lens array.

32. A view finder apparatus as set forth in claim 31, wherein said light source includes a lighting means and a condenser lens, said condenser lens being designed to convert light from said lighting means into a light beam having a narrower directivity.

33. A view finder apparatus as set forth in claim 31, wherein each of the positive lens element of said second lens array is designed for forming an imaginary object located adjacent each of the positive lens elements of said first lens array on a pupil of said magnifying lens on a side of said light valve.

* * * * *